(12) United States Patent
Wolfish et al.

(10) Patent No.: US 7,917,643 B2
(45) Date of Patent: *Mar. 29, 2011

(54) DIGITAL INFORMATION LIBRARY AND DELIVERY SYSTEM

(75) Inventors: Howard Wolfish, Berkeley Heights, NJ (US); Igor Grebnev, Fair Lawn, NJ (US); Benjamin Che-Ming Jun, Oakland, CA (US); Guy Story, New York, NY (US); Alexander Galkin, East Brunswick, NJ (US)

(73) Assignee: Audible, Inc., Newark, NJ (US)

( * ) Notice: Subject to any disclaimer, the term of this patent is extended or adjusted under 35 U.S.C. 154(b) by 1279 days.

This patent is subject to a terminal disclaimer.

(21) Appl. No.: 10/986,736

(22) Filed: Nov. 12, 2004

(65) Prior Publication Data

US 2006/0074985 A1 Apr. 6, 2006

Related U.S. Application Data

(60) Continuation-in-part of application No. 09/867,505, filed on May 29, 2001, which is a division of application No. 09/234,044, filed on Jan. 19, 1999, now Pat. No. 6,560,651, which is a continuation of application No. 08/710,114, filed on Sep. 12, 1996, now Pat. No. 5,926,624.

(51) Int. Cl.
*G06F 15/16* (2006.01)
(52) U.S. Cl. .......................... 709/231; 709/236; 709/237
(58) Field of Classification Search .................. None
See application file for complete search history.

(56) References Cited

U.S. PATENT DOCUMENTS

| | | | |
|---|---|---|---|
| 3,763,330 | A | 10/1973 | Fulwiler |
| 3,871,112 | A | 3/1975 | Licitis |
| 4,159,417 | A | 6/1979 | Rubincam |
| 4,266,243 | A | 5/1981 | Shutterly |
| 4,393,277 | A | 7/1983 | Besen et al. |
| 4,455,651 | A | 6/1984 | Baran |
| 4,473,824 | A | 9/1984 | Claytor |
| D276,626 | S | 12/1984 | Lockwood |
| 4,490,810 | A | 12/1984 | Hon |

(Continued)

FOREIGN PATENT DOCUMENTS

EP 0 128 093 A1 12/1984

(Continued)

OTHER PUBLICATIONS

Chang, Yee-Hsiang et al. "An Open-Systems Approach to Video on Demand." *IEEE Communications Magazine*, May 1994, pp. 68-79.

(Continued)

*Primary Examiner* — Rupal D Dharia
*Assistant Examiner* — Van Kim T Nguyen
(74) *Attorney, Agent, or Firm* — Knobbe, Martens, Olson & Bear LLP

(57) ABSTRACT

Aspects of the present disclosure relate to a computer system that can transfer a digital information file to a removable media storage. The digital information file can include targeting information, which may include combined descrambling information and information identifying a mobile playback device. The mobile playback device can render the targeted digital information file if the information identifying the mobile playback device included in the targeting information corresponds to an identifier of the mobile playback device, so as to allow the mobile playback device to descramble the targeted digital information file using the descrambling information.

20 Claims, 10 Drawing Sheets

U.S. PATENT DOCUMENTS

| | | | |
|---|---|---|---|
| 4,499,568 A | 2/1985 | Gremillet | |
| 4,545,023 A | 10/1985 | Mizzi | |
| 4,575,621 A | 3/1986 | Dreifus | |
| 4,591,974 A | 5/1986 | Dornbush | |
| 4,601,011 A | 7/1986 | Grynberg | |
| 4,658,093 A | 4/1987 | Hellman | |
| D289,777 S | 5/1987 | Thomas | |
| 4,682,368 A | 7/1987 | Takahashi | |
| 4,698,776 A | 10/1987 | Shibata | |
| 4,725,977 A | 2/1988 | Izumi et al. | |
| 4,772,873 A | 9/1988 | Duncan | |
| 4,779,080 A | 10/1988 | Coughlin et al. | |
| 4,788,543 A | 11/1988 | Rubin | |
| 4,788,675 A | 11/1988 | Jones et al. | |
| 4,791,565 A | 12/1988 | Dunham et al. | |
| 4,851,931 A | 7/1989 | Parker et al. | |
| 4,855,725 A | 8/1989 | Fernandez | |
| 4,885,725 A | 12/1989 | McCarthy et al. | |
| 4,891,838 A | 1/1990 | Faber | |
| 4,899,292 A | 2/1990 | Montagna | |
| D306,589 S | 3/1990 | Murayama | |
| 4,916,441 A | 4/1990 | Gombrich | |
| 4,924,378 A | 5/1990 | Hershey et al. | |
| 4,937,863 A | 6/1990 | Robert et al. | |
| 4,941,040 A | 7/1990 | Pocock et al. | |
| 4,949,187 A | 8/1990 | Cohen | |
| 4,989,179 A | 1/1991 | Simko | |
| 5,008,872 A | 4/1991 | Tomoda et al. | |
| 5,018,017 A | 5/1991 | Sasaki et al. | |
| 5,042,070 A | 8/1991 | Linna et al. | |
| 5,055,947 A | 10/1991 | Satoh | |
| 5,065,258 A | 11/1991 | Warren et al. | |
| 5,065,345 A | 11/1991 | Knowles et al. | |
| 5,091,939 A | 2/1992 | Cole et al. | |
| 5,091,942 A | 2/1992 | Dent | |
| 5,099,422 A | 3/1992 | Foresman et al. | |
| 5,115,508 A | 5/1992 | Hatta | |
| 5,121,492 A | 6/1992 | Saville, III et al. | |
| 5,126,990 A | 6/1992 | Efron et al. | |
| 5,132,992 A | 7/1992 | Yurt et al. | |
| 5,133,076 A | 7/1992 | Hawkins et al. | |
| D330,544 S | 10/1992 | Kane | |
| 5,153,729 A | 10/1992 | Saito | |
| 5,159,182 A | 10/1992 | Eisele | |
| 5,172,413 A | 12/1992 | Bradley et al. | |
| 5,181,107 A | 1/1993 | Rhoades | |
| 5,191,410 A | 3/1993 | McCalley et al. | |
| 5,191,573 A | 3/1993 | Hair | |
| 5,203,001 A | 4/1993 | Yanagiuchi et al. | |
| 5,208,665 A | 5/1993 | McCalley et al. | |
| 5,210,611 A | 5/1993 | Yee et al. | |
| 5,221,838 A | 6/1993 | Gutman et al. | |
| 5,226,080 A | 7/1993 | Cole et al. | |
| 5,237,612 A | 8/1993 | Raith | |
| D339,329 S | 9/1993 | Lacko | |
| D339,554 S | 9/1993 | Davidson | |
| 5,247,347 A | 9/1993 | Litteral et al. | |
| 5,249,166 A | 9/1993 | Hamilton et al. | |
| 5,251,909 A | 10/1993 | Reed et al. | |
| 5,253,275 A | 10/1993 | Yurt et al. | |
| 5,291,554 A | 3/1994 | Morales | |
| 5,311,423 A | 5/1994 | Clark | |
| 5,314,572 A | 5/1994 | Core et al. | |
| 5,319,582 A | 6/1994 | Ma | |
| 5,333,116 A | 7/1994 | Hawkins et al. | |
| 5,355,302 A | 10/1994 | Martin et al. | |
| 5,357,475 A | 10/1994 | Hasbun et al. | |
| 5,359,698 A | 10/1994 | Goldberg et al. | |
| 5,365,502 A | 11/1994 | Misono | |
| 5,371,532 A | 12/1994 | Gelman et al. | |
| 5,383,112 A | 1/1995 | Clark | |
| 5,388,196 A | 2/1995 | Pajak et al. | |
| 5,406,626 A | 4/1995 | Ryan | |
| D358,364 S | 5/1995 | Siddoway | |
| 5,420,690 A | 5/1995 | Koishi | |
| 5,440,336 A | 8/1995 | Buhro et al. | |
| 5,442,389 A | 8/1995 | Blahut et al. | |
| 5,442,390 A | 8/1995 | Hooper et al. | |
| 5,442,789 A | 8/1995 | Baker et al. | |
| 5,463,601 A | 10/1995 | Yanagisawa | |
| 5,483,658 A | 1/1996 | Grube et al. | |
| D366,874 S | 2/1996 | Robinson et al. | |
| 5,491,774 A | 2/1996 | Norris et al. | |
| 5,491,820 A | 2/1996 | Belove et al. | |
| 5,493,677 A | 2/1996 | Balogh et al. | |
| 5,499,221 A | 3/1996 | Ito et al. | |
| 5,499,294 A | 3/1996 | Friedman | |
| 5,504,815 A | 4/1996 | Ryan et al. | |
| 5,506,904 A | 4/1996 | Sheldrick et al. | |
| 5,511,000 A | 4/1996 | Kaloi et al. | |
| 5,511,122 A | 4/1996 | Atkinson | |
| 5,513,260 A | 4/1996 | Ryan | |
| D370,484 S | 6/1996 | Williamson et al. | |
| 5,524,051 A | 6/1996 | Ryan | |
| 5,535,356 A | 7/1996 | Kim et al. | |
| 5,539,658 A | 7/1996 | McCullough | |
| 5,541,638 A | 7/1996 | Story | |
| 5,550,863 A | 8/1996 | Yurt et al. | |
| 5,553,143 A | 9/1996 | Ross et al. | |
| 5,555,098 A | 9/1996 | Parulski | |
| 5,555,441 A | 9/1996 | Haddad | |
| 5,557,541 A | 9/1996 | Schulhof et al. | |
| 5,572,442 A | 11/1996 | Schulhof et al. | |
| 5,574,787 A | 11/1996 | Ryan | |
| 5,579,471 A | 11/1996 | Barber et al. | |
| 5,586,186 A | 12/1996 | Yuval et al. | |
| 5,590,195 A | 12/1996 | Ryan | |
| 5,592,511 A | 1/1997 | Schoen et al. | |
| 5,615,061 A | 3/1997 | Singh | |
| D379,456 S | 5/1997 | Osiecki | |
| 5,629,980 A | 5/1997 | Stefik et al. | |
| 5,630,121 A | 5/1997 | Braden-Harder et al. | |
| 5,634,012 A | 5/1997 | Stefik et al. | |
| 5,634,080 A | 5/1997 | Kikinis et al. | |
| 5,636,276 A * | 6/1997 | Brugger | 705/54 |
| 5,638,443 A | 6/1997 | Stefik et al. | |
| 5,646,992 A | 7/1997 | Subler et al. | |
| 5,646,997 A | 7/1997 | Barton | |
| 5,659,613 A | 8/1997 | Copeland et al. | |
| 5,664,228 A | 9/1997 | Mital | |
| 5,669,283 A | 9/1997 | Iida et al. | |
| 5,673,315 A | 9/1997 | Wolf | |
| 5,673,316 A | 9/1997 | Auerbach et al. | |
| 5,675,734 A | 10/1997 | Hair | |
| 5,699,526 A | 12/1997 | Siefert | |
| 5,715,403 A | 2/1998 | Stefik | |
| 5,724,582 A | 3/1998 | Pelanek et al. | |
| 5,727,156 A | 3/1998 | Herr-Hoyman et al. | |
| 5,727,159 A | 3/1998 | Kikinis | |
| 5,732,219 A | 3/1998 | Blumer et al. | |
| 5,734,719 A | 3/1998 | Tsevdos et al. | |
| 5,734,823 A | 3/1998 | Saigh et al. | |
| 5,734,891 A | 3/1998 | Saigh | |
| 5,745,568 A | 4/1998 | O'Connor et al. | |
| 5,745,879 A | 4/1998 | Wyman | |
| 5,752,244 A | 5/1998 | Rose et al. | |
| 5,757,907 A | 5/1998 | Cooper et al. | |
| 5,758,069 A | 5/1998 | Olsen | |
| 5,761,485 A | 6/1998 | Munyan | |
| 5,765,152 A * | 6/1998 | Erickson | 707/9 |
| 5,769,269 A | 6/1998 | Peters | |
| 5,781,723 A | 7/1998 | Yee et al. | |
| 5,790,423 A | 8/1998 | Lau et al. | |
| 5,793,980 A | 8/1998 | Glaser et al. | |
| 5,796,824 A | 8/1998 | Hasebe et al. | |
| 5,809,144 A | 9/1998 | Sirbu et al. | |
| 5,809,246 A | 9/1998 | Goldman | |
| 5,819,043 A | 10/1998 | Baugher et al. | |
| 5,825,883 A | 10/1998 | Archibald et al. | |
| 5,841,979 A | 11/1998 | Schulhof et al. | |
| 5,845,065 A | 12/1998 | Conte et al. | |
| 5,860,068 A | 1/1999 | Cook | |
| 5,872,928 A * | 2/1999 | Lewis et al. | 709/222 |
| 5,881,225 A | 3/1999 | Worth | |
| 5,889,860 A | 3/1999 | Eller et al. | |
| 5,892,900 A | 4/1999 | Ginter et al. | |
| 5,910,987 A | 6/1999 | Ginter et al. | |

| | | | |
|---|---|---|---|
| 5,915,019 | A | 6/1999 | Ginter et al. |
| 5,917,912 | A | 6/1999 | Ginter et al. |
| 5,918,213 | A | 6/1999 | Bernard et al. |
| 5,920,861 | A | 7/1999 | Hall et al. |
| 5,926,624 | A | 7/1999 | Katz et al. |
| 5,928,330 | A | 7/1999 | Goetz et al. |
| D413,097 | S | 8/1999 | Chang |
| 5,931,901 | A | 8/1999 | Wolfe et al. |
| 5,933,498 | A | 8/1999 | Schneck et al. |
| 5,940,504 | A | 8/1999 | Griswold |
| 5,943,422 | A | 8/1999 | Van Wie et al. |
| 5,949,876 | A | 9/1999 | Ginter et al. |
| 5,963,916 | A | 10/1999 | Kaplan |
| 5,966,440 | A | 10/1999 | Hair |
| 5,969,283 | A | 10/1999 | Looney et al. |
| 5,970,252 | A | 10/1999 | Buxton et al. |
| 5,982,891 | A | 11/1999 | Ginter et al. |
| 5,991,402 | A | 11/1999 | Jia et al. |
| 6,002,720 | A | 12/1999 | Yurt et al. |
| 6,005,938 | A | 12/1999 | Banker et al. |
| D419,956 | S | 2/2000 | Lucaci et al. |
| 6,026,368 | A | 2/2000 | Brown et al. |
| 6,028,936 | A | 2/2000 | Hillis |
| 6,044,471 | A | 3/2000 | Colvin |
| 6,067,562 | A | 5/2000 | Goldman |
| 6,088,450 | A | 7/2000 | Davis et al. |
| 6,112,181 | A | 8/2000 | Shear et al. |
| 6,138,119 | A | 10/2000 | Hall et al. |
| 6,141,693 | A | 10/2000 | Perlman et al. |
| 6,157,721 | A | 12/2000 | Shear et al. |
| 6,157,929 | A | 12/2000 | Zamiska et al. |
| 6,158,005 | A | 12/2000 | Bharathan et al. |
| 6,170,060 | B1 | 1/2001 | Mott et al. |
| 6,182,126 | B1 | 1/2001 | Nathan et al. |
| 6,185,683 | B1 | 2/2001 | Ginter et al. |
| 6,226,618 | B1 | 5/2001 | Downs et al. |
| 6,230,173 | B1 | 5/2001 | Ferrel et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,317,779 | B1 * | 11/2001 | Gile et al. ............... 709/217 |
| 6,363,488 | B1 | 3/2002 | Ginter et al. |
| 6,385,596 | B1 | 5/2002 | Wiser et al. |
| 6,389,402 | B1 | 5/2002 | Ginter et al. |
| 6,389,541 | B1 | 5/2002 | Patterson |
| 6,427,140 | B1 | 7/2002 | Ginter et al. |
| 6,449,367 | B2 | 9/2002 | Van Wie et al. |
| 6,490,432 | B1 * | 12/2002 | Wegener et al. ............. 455/3.05 |
| 6,505,160 | B1 * | 1/2003 | Levy et al. ............... 704/270 |
| 6,636,276 | B1 | 10/2003 | Rosenbluth |
| 6,973,306 | B2 | 12/2005 | Kim |
| 6,993,131 | B1 * | 1/2006 | Meyers ............... 380/201 |
| 6,996,537 | B2 * | 2/2006 | Minear et al. ............... 705/26 |
| 7,047,241 | B1 * | 5/2006 | Erickson ............... 707/9 |
| 7,062,543 | B2 | 6/2006 | Kishimoto |

FOREIGN PATENT DOCUMENTS

| | | |
|---|---|---|
| EP | 0 302 710 A2 | 8/1989 |
| FR | 2 651 352 A2 | 3/1991 |
| JP | 2047771 | 2/1990 |
| JP | 2216687 | 8/1990 |
| JP | 3127295 | 5/1991 |
| JP | 4273598 | 9/1992 |
| JP | 5250268 | 9/1993 |
| JP | 7065036 | 3/1995 |
| JP | 7129475 | 5/1995 |
| JP | 07129604 | 5/1995 |
| JP | 7296008 | 11/1995 |
| JP | 7296509 | 11/1995 |
| JP | 0865622 | 3/1996 |
| WO | WO 87/04309 | 7/1987 |
| WO | WO96/12257 | 4/1996 |
| WO | WO96/24105 | 8/1996 |
| WO | WO 96/27155 | 9/1996 |
| WO | WO 96/35987 | 11/1996 |

OTHER PUBLICATIONS

Cox, Meg. "Electronic Campus: Technology Threatens to Shatter the World of College Textbooks." *The Wall Street Journal*, Tuesday, Jun. 1, 1993, 2 pgs.

Deloddere, Daniel et al. "Interactive Video on Demand." *IEEE Communications Magazine*, May 1994, pp. 82-88.

Desmedt, Y., et al,. *Multi-Receiver/Multi-Sender Network Security: Efficient Authenticated Multicast/Feedback*, IEEE INFOCOM '92, 1992, pp. 2045-2054.

Dvorak, Radka, et al, *A Methodology for User Centered Link Structures for Textbook to Hypertext Conversion*, IEEE 1992, pp. 619-628.

Farn, Kwo-Jean, of al, *An Authenticate Processing for the Information System in Industrial Technology Research Institute*, in IEEE International Carnahan Conference on Security Technology, 1991, pp. 59-67.

Fisher, Daniel, *This Little Computer Tries to be a Book*, St. Lois Post-Dispatch, Jan. 4, 1995, 2 pp.

Gilles, John. Web Review—Liquid Audio Fine Tunes Music on Demand. http://www.webreview.com/97/01/03/feature/index.html, Jan. 1997.

Jones, Richard J, *Baseband and Passband Transport Systems for Interactive Video Services*, IEEE Communicaitions Magazine, May 1994, pp. 90-101.

Kang, Chang Goo.,. *New Digital Multisignature Scheme in Electronic Contract Systems*, Proceedings 1995 IEEE International Symposium on Information Theory: Whistler Conference Centre, Whistler, British Columbia, Canada, Sep. 17-22, 1995, p. 486.

Kaplan, Marc A., *IBM Cryptolopes™, SuperDistribution and Digital Rights Management*, http://www.research.ibm.com/people/k/kaplan/cryptolope-docs/crypap.html, Mar. 27, 2000, 9 pgs.

*Microsoft Computer Dictionary* (Microsoft Press $2^{nd}$ ed. 1994), pp. 188-213.

Nessett, D.M., *Layering Central Authentication on Existing Distributed System Terminal Services*, IEEE 1989, pp. 290-299.

Pobiak, Bernard C., *Adjustable Access Electronic Books*, IEEE 1992, pp. 90-94.

Ramanathan, Sprinivas and P. Venak Rangan, *Architectures for Personalized Multimedia*, IEEE Multimedia 1994, pp. 37-46.

Ramos, Tony, *Can you Digit? Making Book on Electronics Books*, Collegestore Journal, Sep./Oct. 1992, 2 pp.

Schulof, Nathan, et al., *Information Highway Media Corp. Retains Von Gehr International as Investment Banker*, Investment Highway Media Corporation, Oct. 13, 1994, 1 pg.

Schulof, Nathan, *Silicon Valley Start-Up to Create New On-ramp to the Information Superhighway with its Listen-Up Audio System and Audio-On-Demand Subscription Service*, Information Highway Media Corporation, Sep. 1994, 3 pp.

Steinert-Threlkeld, Tom, *Now, Data by Satellite*, Inter@ctive Week, 1 pg.

Watanabe, Toyohide, et al. *Visual Interface for Retrieval of Electronic-formed Books*, IEEE 1993, pp. 692-695.

Ziegler, Bart, *IBM to Unveil Plan to Skip Disks, Send Software by Satellite*, The Wall Street Journal, Tuesday, Nov. 1, 1994, 1 pg.

*Aural Hygiene*. AutoWeek, Nov. 14, p. 10.

*PC Today Features News Article on Information Highway Media Corporation: Be Listening Up*, 76 PC Today, Jan. 1995, 1 pg.

*Buying Music Over the Internet*, Newsbytes. http://drlink.mnis.net/cgi-bin/index.cg.N=Reynolds%2C+Pamela&U=preynolds&B=Rank, Jan. 1997.

*The Captive Audience Network*, 44 Popular Science. Feb. 1995, 1 p.

Nelson B. Heller & Associates. The Heller Report, vol. IV, No. 12, Oct. 1993, 3 pgs.

International Search Report for PCT/US97/16184, mailed Jan. 30, 1998, 1 pg.

*Listen Up Audio System and Audio on Demand Subscription Service Write-Up*, Electronic Entertainment. Feb., 1 p.

*Listen Up Audio System and Audio-On-Demand to Open New Infobahn On-ramp*, Information Highway Media Corporation, IHM-94001.F.9/19/94, 1 pg.

*Read Me a Story*, Popular Mechanics, Feb. 1995, 1 p.

European Search Report for EP 98 95 3222, mailed Feb. 24, 1999, 1 p.

Aggarwal et al., "Predictors of Mortality and Resource Utilization in Cirrhotic Patients Admitted to the Medical ICU*", Chest, May 5, 2001, vol. 119, pp. 1489-1497.

Deloddere et al., "Interactive Video on Demand", IEEE Communications Magazine, May 1994.

Desmedt, et al., Multi-Received/Multi-Sender Network Security, INFOCOM, 1992, pp. 2045-2054.

J. Richard Jones, "Baseband and Passband Transport Systems for Interactive Video Services", IEEE Communications Magazine, May 1994.

Listen Up audio system and Audio on Demand subscription service write-up; Electronic Entertainment; February 1 pg; date unknown.

Nessett, D.M., "Layering Central Authentication on Existing Distributed System Terminal Services", Security and Privacy, 1989 IEEE Symposium; IEEE 1989; pp. 290-299.

Ramanathan et al., Architectures for Personalized Multimedia, IEEE Multimedia, 1994, Issue XP00044087, pp. 37-46.

* cited by examiner

DIGITAL INFORMATION LIBRARY AND DELIVERY SYSTEM

RELATED APPLICATIONS

The present patent application is a continuation-in-part of Ser. No. 09/867,505 filed May 29, 2001, which is a divisional of Ser. No. 09/234,044 filed Jan. 19, 1999 now U.S. Pat. No. 6,560,651, which is a continuation of Ser. No. 08/710,114 filed Sep. 12, 1996 now U.S. Pat. No. 5,926,624.

FIELD OF THE INVENTION

The present invention relates generally to a digital information transmission, receiving, and playback system. Specifically, the present invention pertains to a computer network based digital information library providing interactive client computer access.

DESCRIPTION OF RELATED ART

Recent technological advances in the compression of digital data and the expansion of storage capacities of computer systems together with the increased bandwidth of computer network infrastructures have created new possibilities for personalized access to and usage of large amounts of digital information. One form of this type of digital information is audio information delivered across a computer network as digitized information.

In the field of interactive digital information transmission, receiving, and playback systems, several patents are known to the present applicants. U.S. Pat. No. 5,132,992, issued Jul. 21, 1992 to Yurt et al. (Yurt), describes a system of distributing video and/or audio information employing digital signal processing to achieve high rates of data compression. The Yurt patent describes a transmission system including a conversion means for placing the items from a source material library into a predetermined format as formatted data. Audio data is compressed by an audio compressor by application of an adaptive differential pulse code modulation (ADPCM) process to the audio data. Stored items are accessed in the compressed data library through the use of a unique address code assigned to each item during storage encoding. The unique address code is used for requesting and accessing information and items throughout the Yurt transmission and receiving process. The Yurt transmission system includes means by which a user enters a customer identifier (ID) code by which the system accesses the users account, and indicates to the system that the user is a subscriber of the system. If a subscriber is in good standing, the Yurt system delivers selected titles using the described techniques.

One significant problem with the audio transmission and receiving system described in Yurt is the lack of an effective means for ensuring the security of the digital information library and of the items downloaded to a user from the digital information library. Although Yurt describes the use of a unique identification code assigned to items in the library and a customer ID code assigned to particular users, no authentication protocols or encryption techniques are described to prevent the unauthorized creation of clone libraries or the unauthorized download or copying of library items. Secondly, Yurt and related prior art does not describe an authentication or encryption means providing secure transactions between a server based digital information library supporting a client computer system having an interface to a mobile playback device. Thirdly, the prior art does not describe a mechanism for selecting a digital information passage to be previewed. Prior art systems also do not describe a system whereby only part of a program gets downloaded from a client computer system to a mobile playback device depending on how much storage space is available in the mobile playback device. Prior art systems also do not describe a mechanism for specifying multiple programs to be downloaded from a digital information library into a mobile playback device. Prior art systems also do not detail the processes required in the authoring system to generate content for the digital information library. Finally, prior art systems do not describe an accounting system whereby library content providers can perform real-time queries on usage information related to the access of library items.

SUMMARY OF THE INVENTION

The preferred embodiment of the present invention is a computer network based digital information library system employing authentication, targeting, and encryption protocols for the secure transfer of digital information library programs to a client computer system and a mobile digital information playback device removably connectable to the client computer system. The present invention is a computer network based library and information delivery system for accessing and obtaining selected digital information files. The library and information delivery system comprises: 1) a library server having a plurality of digital information files; 2) a client computer system coupled to the library server over a network; and 3) a mobile device removably connectable to the client computer system, the client computer system including logic for requesting a download of a selected one or more of the digital information files from the library server, the client computer system further including logic for downloading the selected one or more of the digital information files to the mobile device.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION OF THE PREFERRED EMBODIMENT

The preferred embodiment of the present invention is a computer network based digital information library system employing authentication, targeting, and encryption protocols for the secure transfer of digital information library programs to a client computer system and a mobile digital information playback device removably connectable to the client computer system. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
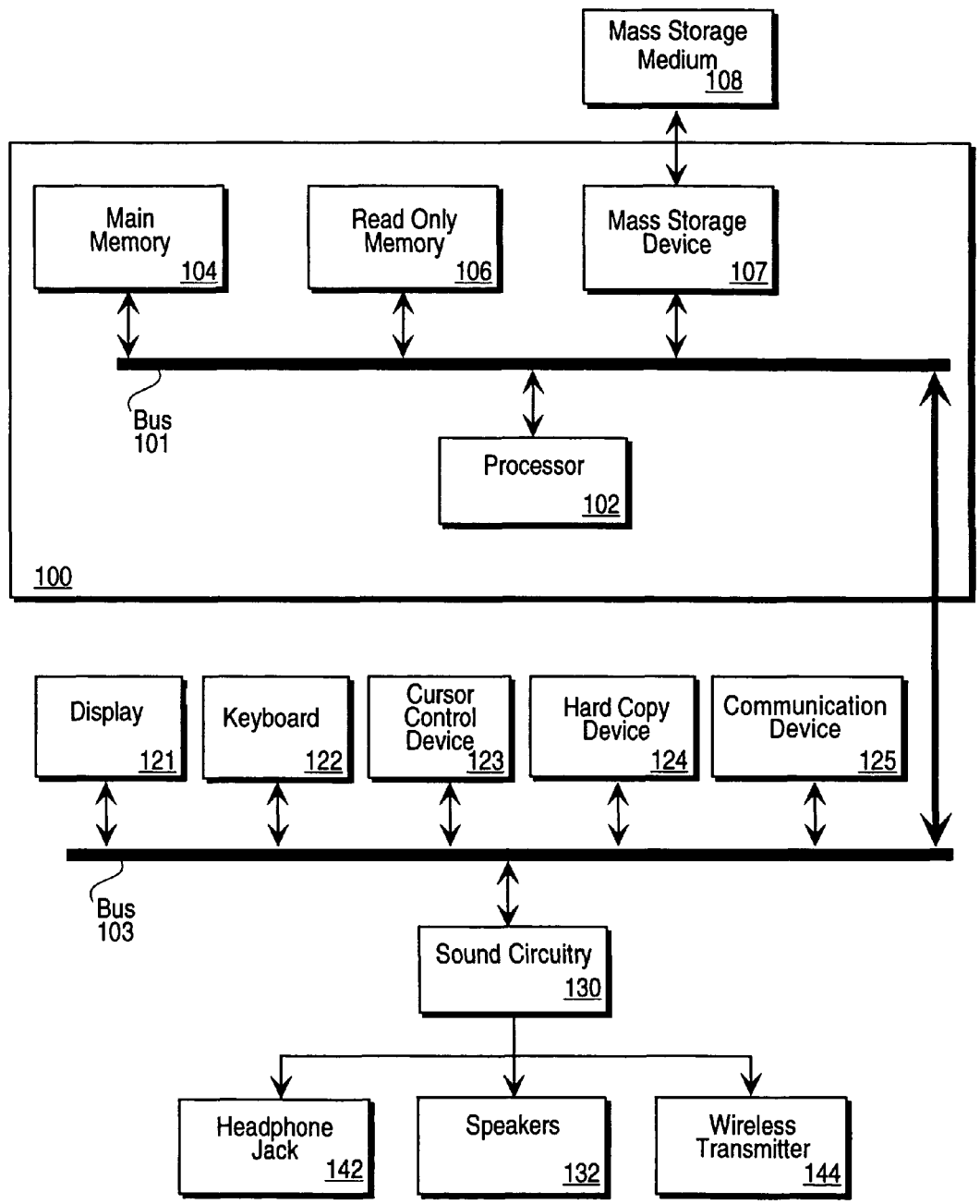
FIG. 1 illustrates a typical computer platform on which the present invention may be implemented.

FIG. 1 illustrates a typical data processing system upon which one embodiment of the present invention is implemented. It will be apparent to those of ordinary skill in the art, however that other alternative systems of various system architectures may also be used. The data processing system illustrated in FIG. 1 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a mass storage device 107 such as a magnetic disk drive or optical disk drive. Mass storage device 107 is coupled to bus 101 and is typically used with a computer readable mass storage medium 108, such as a magnetic or optical disk, for storage of information and instructions. The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control 123, such as a mouse, a trackball, stylus, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. In the preferred embodiment, a communication device 125 is coupled to bus 101 through bus 103 for use in accessing other nodes of a network computer system or other computer peripherals. This communication device 125 may include any of a number of commercially available networking peripheral devices such as those used for coupling to an Ethernet, token ring, Internet, or wide area network. It may also include any number of commercially available peripheral devices designed to communicate with remote computer peripherals such as scanners, terminals, specialized printers, or audio input/output devices. Communication device 125 may also include an RS232 or other conventional serial port, a conventional parallel port, a small computer system interface (SCSI) port or other data communication means. Communications device 125 may use a wireless means of data transfer devices such as the infrared IRDA protocol, spread-spectrum, or wireless LAN. In addition, communication device 125 is used in the preferred embodiment to couple the mobile playback device 212 to the client computer system 214 as described in more detail below. One other device used in the preferred embodiment is sound circuitry 130 either with attached speakers or headphones 132, or with analog audio outputs suitable for input into audio reproduction equipment such as external amplifiers and speakers, cassette adapters, etc. Sound circuitry 130 is well known in the art for playing audio files. Alternatively, sound circuitry may be a radio transmitter which transmits audio data on a predefined frequency for reception and playback by a radio receiver. Other wireless methods are possible.

Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 1 is an IBM® compatible personal computer (PC), an Apple MacIntosh® personal computer, or a SUN® SPARC Workstation. Processor 102 may be one of the 80X86 compatible microprocessors such as the 80486 or PENTIUM® brand microprocessors manufactured by INTEL® Corporation of Santa Clara, Calif.

The software implementing the present invention can be stored in main memory 104, mass storage device 107, or other storage medium accessible to processor 102. It will be apparent to those of ordinary skill in the art that the methods and processes described herein can be implemented as software stored in main memory 104 or read only memory 106 and executed by processor 102. This software may also be resident on an article of manufacture comprising a computer usable mass storage medium 108 having computer readable program code embodied therein and being readable by the mass storage device 107 and for causing the processor 102 to perform digital information library transactions and protocols in accordance with the teachings herein.

Digital Information Library System

Figure 2:
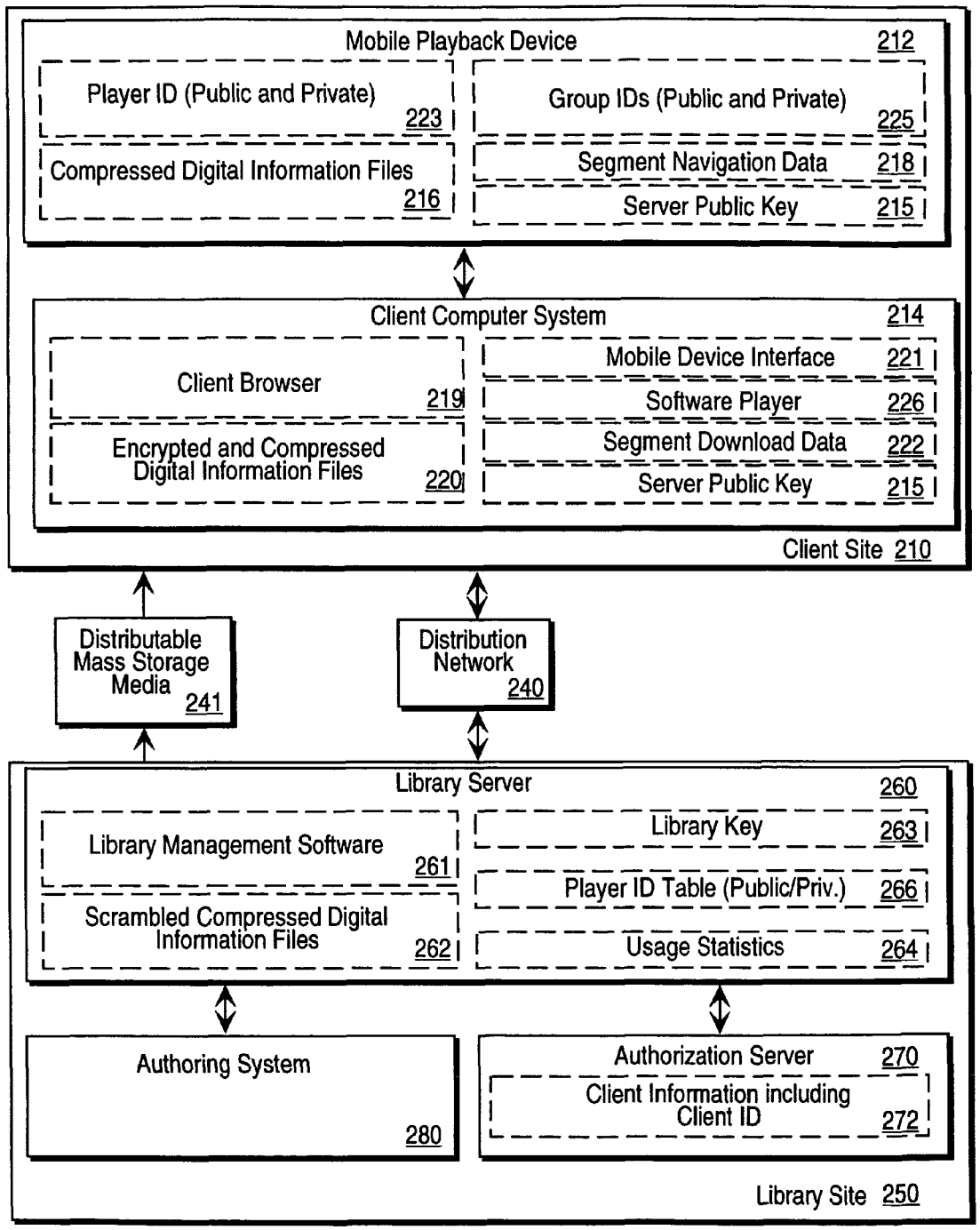
FIG. 2 illustrates a high level block diagram of the computer network based digital information library system of the present invention.

FIG. 2 illustrates the computer network architecture used in the preferred embodiment of the present invention. In general, the network architecture of the present invention includes a library site 250 coupled to a client site 210 via a conventional distribution network infrastructure 240. This conventional distribution network infrastructure 240 can be implemented as a standard telephone connection provided between the library site 250 and client site 210 through an Internet provider to enable data communication on the Internet over a conventional telephone network. This use of the Internet as a distribution network is well known to those of ordinary skill in the art. In an alternative embodiment having cable modem capability, communication over a conventional cable network is possible in lieu of communication over the telephone network. The cable network is typically much faster (i.e. provides a much greater bandwidth) than the standard telephone network; however, cable modems are typically more expensive than standard POTS (plain old telephone system) modems. In another alternative embodiment having conventional Integrated Services Digital Network (ISDN) capability, the distribution network 240 is accessed using an ISDN modem. Again, the ISDN network is typically faster than the POTS network; however, access to an ISDN network is generally more expensive. Cable modems and ISDN implementations are alternative communications media to the POTS implementation.

In addition, it will be apparent to those of ordinary skill in the art that other forms of networking may equivalently be supported by the present invention. For example, a wireless transmission means such as infrared or radio links may also provide the distribution network 240 described in the present application. As an alternative to the Internet, a proprietary network/bulletin board such as AMERICA-ON-LINE (AOL), or COMPUSERVE may be used.

Each of the servers at library site 250 and the client computer system 214 at client site 210 can be implemented as a computer system such as the one described above in connection with FIG. 1. It will be apparent to one of ordinary skill in the art that the library server 260, authoring system 280, and authorization server 270 can be remotely located yet networked together as a distributed system using the techniques described above. In addition, the present invention allows for multiple library servers, authoring systems and authorization servers. Conversely, the servers may be implemented as separate functions of a single machine. These alternative embodiments are illustrated in FIGS. 4-8 and are described in more detail below.

The mobile playback device 212 is a minimally configured, low-cost, standalone mobile unit for receiving and storing digital information files or programs as downloaded by library server 260 and client computer system 214 and for playing back the digital information files or programs for a user of the mobile playback device 212. The mobile playback device 212 is temporarily removably coupled to the client computer system 214 while the download takes place. Once downloaded, the mobile playback device 212 may be detached from the client computer system 214 and used as a standalone digital information playback device. A co-pending U.S. patent application titled, "Interactive Audio Transmission, Receiving and Playback System", assigned Ser. No. 08/490,537, and assigned to the Audible Words Corporation of Montclair, N.J. describes the details of mobile playback device 212.

In its basic form, the preferred embodiment of the present invention is a digital information library system providing selection of digital information programming on demand over a computer network. In an alternative embodiment, the digital information programming is selected via the computer network but delivered using mass storage media 241. This alternative embodiment is described in more detail below.

The digital information library is an indexed collection of digital information programming, drawing content from digital information sources such as books, daily news and entertainment feeds, conferences and educational sources, other computer systems, the host on the World Wide Web (WWW) of the Internet, and customized audio or visual image programming. Other sources of the digital information content include, but are not limited to, conference or seminar proceedings, lecture or speech materials, language lessons, readings, comedy, customized spoken digests and related, "need-to-know" business information, computer software, local sound studio material, text to speech conversion of machine readable files, pre-recorded material from magnetic tape, CD-ROM, digital audio tape, or analog cassette tape. This digital information content is input as raw digital information content to authoring system 280 shown in FIG. 2. In an alternative embodiment, a raw digital information digitizer 307 is included for receiving raw input and converting the input to a digital form which can be manipulated as a digital information file.

In an alternative embodiment, the digital information comprises digitized image or graphics data used to produce visual images on a display screen or projection screen. These images may be included in the digital information retained and maintained by the library server 260.

Authoring System

Authoring system 280 is used to edit, index, compress, scramble, segment, and catalog digital information content into digital information programs in digital information files, which are stored on mass storage media 241 or on library server 260 as scrambled and compressed digital information files 262. The digital information programs are initially categorized according to traditional criteria (e.g. genre, modern fiction, mystery, adventure, romance, non-fiction, classics, self-help, science fiction, westerns, etc.). Categories associated with specific authors or publishers are also provided. Both unabridged and abridged titles are provided. In some circumstances, it may be necessary to digitize digital information content from an undigitized form. The raw information digitizer 307 is provided for this purpose. Authoring system 280 also partitions digital information content into segments, which can be identified, searched, and skipped over if desired. All of these functions are performed by authoring system 280.

Figure 3:
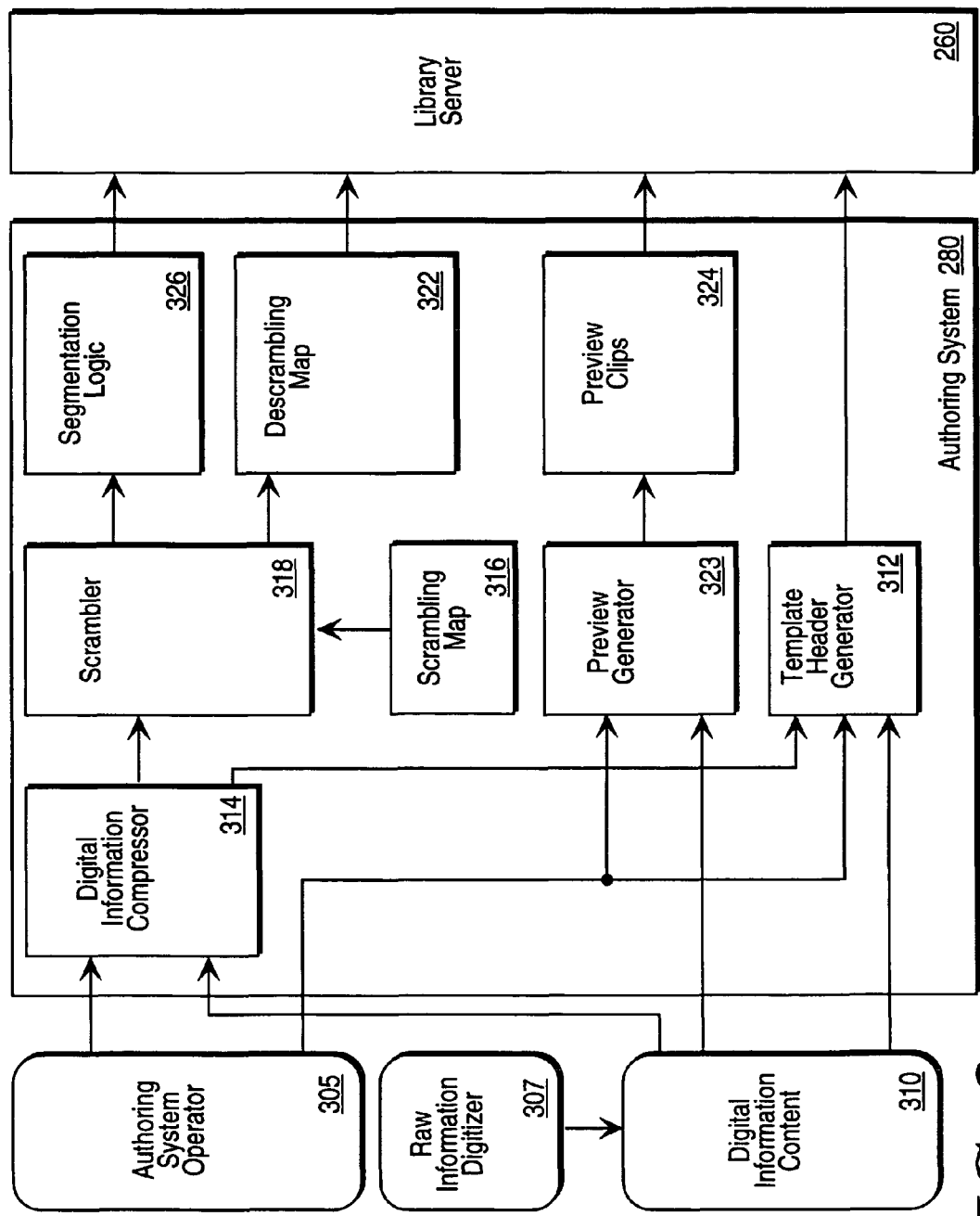
FIG. 3 illustrates a high level block diagram of the authoring system of the present invention.

FIG. 3 illustrates the authoring system 280 of the preferred embodiment. Authoring system 280 receives digital information content from a variety of conventional sources as raw digitized data. This digital information data is fed to three components of the authoring system 280 of the preferred embodiment. The digital information compressor 314 receives the raw digital data and compresses the digitized data. There are a variety of conventional techniques in existence for compressing digital data. These techniques can be optimized depending upon the type of digital data being processed. Thus, the present invention provides several compression methods and a means for the authoring system operator 305 to select between these methods based upon the category of digital information content 310 being input to the digital information compressor 314. Alternatively, the selection of compression method may be performed automatically by interpretation of the digital information content 310 itself. A compressed digital information file is output by digital information compressor 314 to scrambler 318.

The raw digital information content 310 is also fed to template header generator 312. Each digital information file maintained by the library server 260 includes other descriptive information used to identify the file's content and to provide information used to process the digital information within the file. Each digital information file includes a template header, a descrambling map, selected preview clips, and the digital information programming itself. In the preferred embodiment, the template header comprises a number of attributes corresponding to the digital information in the file. For example, the digital information may be audio information generated from the content of a book or other published work. In this example, the audio file template header contains attributes including: 1) the title of a book, volume, or medium from which the digital information content originated, 2) the legal copyright associated with the digital information content, 3) audible title(s) of the content, 4) a table of contents of the content, and 5) playback settings for appropriately playing or rendering the digital information. The table of contents contains content navigation information including but not limited to: the number of chapters, the length of the program, and information indicative of the relevant content sections. The table of contents is generated with input from authoring system operator 305 or automatically by analysis of digital information content 310. The descrambling map 322 is used to interpret the digital information after the digital information has been scrambled by scrambler 318 as described below. The preview clips 324 comprise short pre-generated portions of digital information content used to give a consumer a sense of the content of a particular digital information file. In the preferred embodiment, these previews are generated as conventional formatted files which can be directly played by sound generation circuitry 130 or rendered by other means. A digital information file can have several preview clips associated with it. The preview clips 324 are not compressed or scrambled in the preferred embodiment. The template header 312 remains with the digital information file as it is transferred to the network 240 or mass storage media 241. The other descriptive information related to a digital information file is typically stored with digital information file, but is not required to be so stored.

Referring again to FIG. 3, template header generator 312 generates the template header given information from a particular portion of digital information content 310. Input from Authoring System Operator 305 and Digital Information Compressor 314 may be solicited during the header generation process. The template header is provided to library server 260. Other portions of the digital information file header are provided by scrambler 318 and preview generator 323. These portions of the digital information file header are assembled into the header for a particular digital information file by library server 260. The remainder of the digital information file is filled with compressed, scrambled, and segmented digital information content.

After digital information compressor 314 has compressed the raw digital information using a selected compression method suitable for the category of digital information, the scrambler 318 scrambles the digital information. The digital information is scrambled to prevent an unauthorized consumer from using the digital information. In the preferred embodiment, scrambler 318 uses a conventional encryption method to render the data unusable. A corresponding descrambling map 322 is generated to provide a means for descrambling the scrambled digital information file. A scrambling map 316 is used by scrambler 318 to scramble the digital information file. The scrambler 318 can encrypt the entire digital information file or selected critical subsets of the digital information file. The level of scrambling can be selected depending upon the capabilities of the authoring system 280, the mobile playback device 212 and/or the anticipated software player 226 on client computer system 214. In an alternative embodiment, a proprietary digital information format is used in lieu of scrambler 318.

The scrambled digital information content is output by scrambler 318 to segmentation logic 326. Segmentation logic 326 partitions the digital information content into blocks for efficient storage in and transfer to a mobile playback device 212 or software player 226 and for efficient navigation during playback. Transport integrity data is generated and appended to the segmented digital information. In an alternate embodiment, portions of the segmentation process may take place before or after digital information compressor 314 and scrambler 318. Segmentation information may also be used in the header generation process by template header generator 312. The compressed, scrambled, and segmented digital information blocks are provided to the library server 260 by authoring system 280. Library server 260 assembles the segmented digital information blocks, the descrambling map 322, the preview clip(s) 324, and the template header 312 for a particular item of digital information content into a digital information program file or files, which are stored in a digital information program file storage area 262. Other raw digital information content is converted into digital information files using the authoring system 280 in a similar manner.

Library Server

Referring again to FIG. 2, the library server 260 is responsible for maintaining the digital information program files 262 created by the authoring system 280. In addition, the library server 260 receives requests for access to the digital information program files 262 from client computer systems 214 over network 240 and manages purchase and delivery of the selected digital information files and/or delivery of selected preview clips 324. The library server 260 includes library management software 261 for performing these library server functions and a library key 263 used for the authentication protocol described below. Library management software 261 includes processing logic for receiving and responding to client computer system 214 requests for access and/or purchase of a digital information program file 262. Upon receiving such a client request, library server 260 uses authorization server 270 to authenticate the request with client information 272 generated and maintained by library server 260 or authorization server 270. The client information 272 includes client identifiers which are used to target content for playback on individual mobile playback devices 212 or software players 226. Client information 272 may also contain client personal information, user content preferences, client billing history, player usage history, and player group lists. In an alternative embodiment, portions of client information 272 may instead be stored in server 260. Using the authorization protocol described in more detail below, the library server 260 determines if the client request can be serviced. If approved, the library server 260 accesses the digital information program file(s) or preview clip(s) requested by the client computer system 214, delivers the selected preview clip(s) or builds encrypted, targeted, and digitally signed digital information files using the authentication protocol described in more detail below, and transfers the encrypted and compressed digital information file(s) to the requesting client computer system 214 via network 240. Distributable mass storage media 241 may also be used as a delivery medium for the transfer of information to client system 214. The client computer system 214 may then independently download the selected digital information files (or a subset thereof) into the mobile playback device 212 for subsequent playback. The library server 260 also collects usage statistics on the access history of the digital information files 262 and stores this usage data into usage statistic storage area 264. The library server 260 also stores operating code segments (firmware) for the client browser 219, software player 226, and for mobile playback device 212. This operating code can be downloaded to the client computer system 214 in the same manner as digital information files are transferred. Player configuration data for playback device 212 and software player 226 is stored on the library server 260 and can be customized or updated in the same manner as digital information files and firmware are transferred. Configuration data includes, but is not limited to, audio prompts, user interface options, group ID information, and information playback parameters. Player configuration data is transferred to client computer system 214, software player 226, or mobile playback device 212 as required according to client information 272.

The library server 260 interfaces with a client application program or client browser 219 executing on client computer system 214. The client browser 219 is used to make requests of library server 260 for various types of service including, but not limited to, searching the digital information files 262 for a desired program, previewing a selected preview clip associated with a digital information file 262, purchasing a selected program, requesting operating code segments or player configuration data, and downloading the purchased program or other material to the requesting client computer system 214.

The library server 260 interface with the authorization server 270 and client computer system 214 uses the unique authentication protocol and encryption protocol of the preferred embodiment of the present invention. The preferred embodiment of these protocols is described in the sections below.

Client Computer System

Referring again to FIG. 2, the client computer system 214 represents a consumer or end user computer system, typically a personal computer, such as the sample system illustrated in FIG. 1, with which a consumer may browse, preview, select, purchase, and take delivery of digital information content from digital information library server 260 across distribution network 240. Client computer system 214 comprises client browser software 219, a mobile device interface 221, storage for encrypted and compressed digital information files 220 downloaded from the network 240, software player 226, and segment download data 222 derived from digital information files 220 for defining the storage segments in mobile playback device 212 and for assisting in the downloading of digital information files 220 from client computer system 214 to mobile playback device 212. Client computer system 214 also includes a server public key 215 used for authenticating digital information and software files received from server 260. Client browser software 219 provides the control logic with which the client or consumer accesses and purchases titles from the digital information library 262 of library server 260. Client browser software 219 also provides control logic which requests and downloads configuration information or operating code from server 260. The client browser software 219 can be configured to perform these operations without direct human intervention. The mobile device interface 221 is a software interface used to control the transfer of control information, operating code, and digital information files from client computer system 214 to mobile playback device 212. Encrypted and compressed digital information files 220 are received by client computer system 214 from library server 260 over network 240. In an alternate embodiment, distributable mass storage media 241 is used instead of network 240 to transfer information to client computer system 214. The software player 226 is a software module used to emulate the operation of mobile playback device 212 and for playing digital information files through the sound circuitry 130 and audio output device 132 of client computer system 214. Operating code and configuration information for the software player 226 can be downloaded or updated from the server 260 in the same manner as the mobile playback device 212 can be downloaded or updated. The software player 226 functionality is the equivalent of the functionality and operation of the mobile playback device 212. Thus, the use of the term "player" throughout this document generally applies to both the mobile playback device 212 and software player 226. Software players 226 are assigned unique player IDs and can be assigned group IDs that function similarly to IDs assigned to mobile playback devices 212.

Mobile Playback Device

The mobile playback device 212 converts a digital information file into sound or displayable imagery which is played through audio output means or displayed on a display device. In the preferred embodiment, the mobile playback device 212 is a minimal capability, low-cost device primarily dedicated to playing audio files or displaying visual images or text on a display device. The mobile playback device 212 is minimally configured to retain its light-weight, low cost, and readily mobile features. The preferred embodiment does not therefore include the use of a portable personal computer or laptop computer as the mobile playback device 212; because, such general purpose computing devices typically do not meet the light-weight and low cost constraints of the preferred mobile playback device 212. Such general purpose computing devices typically have unnecessary functionality, more complicated interfaces, and may suffer cost and performance penalties in comparison to the special purpose mobile playback device 212. In the preferred embodiment, the mobile playback device 212 includes a processor, memory, and an interface to client computer system 214 over which compressed digital information files 216 are received. As described in more detail below, mobile playback device 212 also includes a player ID 223, group IDs 225, and server public key 215 used for authenticating digital information and software files received from server 260 via client computer system 214. The user controls the mobile playback device 212 using buttons and knobs provided on the device. These controls are used to navigate through digital information files 216, adjust configuration data and playback parameters, or perform other functions as directed by firmware stored in playback device 212. When coupled to the player, client computer system 214 or other electronic devices can solicit user input from these controls. In an alternative embodiment, a set of additional user controls is provided on a remote control unit that is coupled to the player via a wired or wireless connection. Digital information output may be provided via a headphone jack, on board speaker, or wireless transmitter to a separate wireless receiver with speakers or headphones. Audio level can be adjusted with a volume knob. A wireless transmitter may contain an adjustment knob to adjust the transmission frequency or other transmission parameters. Visual information output is provided via LCD display, LED display, or outputs to a standard visual display device. The mobile playback device 212 contains a limited quantity of non-volatile memory, RAM, and ROM. Digital information content, configuration data, and operating code are stored in the memory space of the mobile playback device 212. Configuration data includes but is not limited to: public and private IDs, content playback parameters, and user interface parameters. The use of non-volatile memory allows portions of the digital information content, configuration data, and firmware to be updated via download. Both digital information content and firmware (operating software) is stored in this memory device. Portions of the firmware and configuration information are stored permanently in a read only memory (ROM). An internal memory allocation method is used to track the content of mobile playback device 212 memory. This allocation method, in conjunction with segment navigation data 218, also provides the means for locating desired digital information, program, configuration data, or header data resident in the mobile playback device 212 memory. The mobile playback device 212 includes an interface to the client computer system 214 through which the mobile playback device 212 receives compressed digital information files 216, software updates, and configuration changes from client computer system 214.

Downloading Digital Information Content, Software Updates, or Configuration Information from the Library Server to the Client Computer System The client browser software 219 of client computer system 214 operates in cooperation with library management software 261 of library server 260 and the firmware resident on the mobile playback device 212 to provide a means by which a consumer may browse, preview, select, purchase, and take delivery of selected digital information content from digital information library server 260 across distribution network 240. The digital information content is typically downloaded to the client computer system 214 at the time of purchase, but it is possible to download digital information content either, 1) sometime after the purchase, or 2) multiple times after an initial purchase. The client browser 219 can be configured to download content to client computer system 214 without user intervention. In addition, portions of the client computer system 214 software itself or mobile playback device 212 resident software/firmware may be downloaded or updated from library server 260. The mobile playback device 212 resident software/firmware is downloaded through client computer system 214. If library server 260 has an updated or more recent copy of client computer system 214 software or mobile playback device 212 software/firmware, the library server copy is downloaded to replace the outdated version of the corresponding client computer system 214 software or mobile playback device software 212. The software is encrypted, scrambled, and digitally signed in a manner similar to the scrambling and delivery of the digital information files. Changes to the ED list, audio prompts, and other configuration data for playback device 212 can be downloaded in a manner similar to the downloading of software updates from library server 260.

The preferred embodiment utilizes three authentication processes to protect the transfer of information from server 260 to client system 214 and playback device 212. First, a point-to-point authentication protocol is performed whereby the library server 260 must verify that the requesting client computer system 214 is an authorized client and the client computer system 214 must verify that the library server 260 is an authorized provider. Secondly, a targeting protocol is performed whereby the library server 260 utilizes a set of identifiers (i.e. player IDs) for mobile playback devices 212 authorized to receive the selected download data from library server 260. The mobile playback device identifiers are provided by client computer system 214 or are referenced from user profiles stored on library server 260. In the targeting process, library server 260 formats and downloads data that can only be read by mobile devices 212 with these identifiers. Thirdly, a library server digital signature is appended to the downloaded data for use by the mobile playback device 212 to verify that the downloaded data was originated by an authorized library server. These three authentication processes of the present invention are described in detail in the following sections.

Point-to-Point Authentication Protocol

The library server 260, client computer system 214, and mobile playback devices 212 each have a unique verification sequence which is used to verify the authenticity of another system. In communications between library server 260 and client system 214, both systems alternately act to (1) request verification of the other system and (2) provide an authenticating response to a verification request. Communication between mobile devices 212 and client computer system 214 use a similar authentication protocol, as well as real-time communication between mobile devices 212 and library server 260 via client system 214. This verification sequence comprises a pre-defined set of bit streams or data structures which are sent by the requesting system (i.e. the system requesting verification) to the receiving system being authenticated (i.e. the respondent) in a point-to-point transmission. The receiving system must respond to the verification sequence in a pre-defined manner by sending particular response bit streams or data structures to the requesting system. If the appropriate response data from the respondent is received by the requesting system, the system being verified is considered an authorized system. Conversely, the system being verified is considered unauthorized if the appropriate response data is not received by the requesting system prior to a pre-defined time-out period. Both systems begin communication by acting as requesters and respondents in separate verification cycles. Upon completion of these point-to-point authentication cycles, further client/server processing only continues if both systems deem each other to be authorized systems.

In an alternate embodiment, point-to-point authentication is used in a subset of the communications among library server 260, client computer system 214, and mobile playback devices 212. In another embodiment, point-to-point authentication is not used and system security rests on the use of targeting and/or digital signature authentication.

Targeting Protocol

The targeting protocol of the present invention is a means and method for limiting the playback of digital information content, the adjustment of player configuration data, and the download of player operating code to a specified player 212/226 or a specified set of mobile playback devices 212. Each player 212/226 contains a unique player ID 223. The player ID 223 comprises a public player ID and a private player ID. The public player ID is a unique identifier and serves as a serial number for player identification. The private player ID is used to target data for individual mobile playback devices 212. Private player IDs are never sent through any communications link or network path, except during installation. In the preferred embodiment, private player IDs should be sufficiently diverse, but need not be unique.

Mobile playback devices 212 may be logically grouped together using a Group ID. Digital information content, software, or configuration data changes may be targeted to a group of mobile playback devices 212 defined by a group ID. Each player 212/226 includes memory space for storage of one or more group IDs 225 of which the particular player 212/226 is a member. Each group ID includes a public portion and a private portion, each of which is equivalent to the public and private player IDs, respectively. Each group is identified by a uniquely valued public ID that is not shared with other player or group IDs. Digital information content, software, or configuration data can be targeted to a particular group ID in the same way as it would be targeted for a specific player ID. Mobile playback devices 212 in the same group share the same Group ID. A particular Group ID is pre-defined as the global group to which all mobile playback devices 212 are a member. Mobile playback devices 212 may be members of more than one group. A particular player 212/226 is added to a new group by appending the new group ID to the set of group IDs 225 maintained in the particular player 212/226. The new group ID is appended after the server 260 provides a public group ID and a group key to the player 212/226 via client computer system 214. The player 212/226 generates a private group ID from the combination of the group key and the mobile playback device's 212 private player ID. As with the private player ID, the private group ID is never sent through any communications link or network path, except during installation. In an alternative embodiment, players receive the group private ID directly or by combining the group key with the players public ID or other known numeric value. In another alternative embodiment, the private group ID is not used in the targeting process and is not transferred to the player. The group assignment process may be restricted to using real-time communications between server 260 and the player via client system 214, or it may take place sometime after group assignments have been downloaded to client system 214. Having described the player IDs and group IDs defined in the present invention, the use of these IDs in the targeting protocol is described next.

Library server 260 includes a player ID table 266 as shown in FIG. 2. Player ID table 266 includes a storage area for private IDs and public IDs. The private IDs are pre-loaded into player table 266 when a new mobile playback device is installed into the system or when a new group is established. In another embodiment, ID table 266 is a mathematical function which converts group or player public IDs. Public player and group IDs are sent by a client computer system 214 to the server 260 when the client computer system 214 desires to target a particular player 212/226 or set of mobile playback devices 212 to a particular specified digital information, software content, or configuration data selection. Digital information selection is made from the files 262 stored on library server 260. Software or configuration data selection is made from files stored on server 260 or from data generated upon request by server 260. Software content and configuration data is prepared and scrambled in a manner similar to the authoring process for digital information content. Once an association is made by client computer system 214 between a set of targeted public IDs and the associated data to be transferred from server 260, library server 260 creates a targeted header for the selected files. The library management software 261 consults the public ID to private ID table 266 to locate the corresponding targeted private ID(s). The targeted header comprises a combination of the descrambling map 322 from the selected files with the private player IDs corresponding to the targeted mobile playback devices 212. The descrambling map 322 is thereby encrypted using the secret IDs of the targeted mobile playback device(s) 212. This targeted header is linked with the corresponding digital information or software content of the selected file in a network transport ready data block. A digital signature is applied to the data block as described below in connection with the data signature protocol. Transport integrity data (such as the use of checksums or cyclic redundancy check) is applied to the data block and the data block is sent to the client computer system 214 via network 240. Because the data block can only be unscrambled using the corresponding descrambling block 322 in its header and because the descrambling block 322 was combined (i.e. encrypted) with a private ID known only by the targeted mobile playback device(s) 212, only the targeted mobile playback device(s) 212 will be able to unscramble and read the data block. The selected digital information, software content, and configuration data is thereby targeted to a particular set of mobile playback devices 212.

For small groups of mobile playback devices 212, each targeted header of a digital information file may contain a plurality of descrambling maps, each associated with a different player 212/226. In this manner, multiple mobile playback devices 212 can read a single file 220 stored on the client computer system 214.

A person of ordinary skill in the art will note that alternative methods of targeting exist. In an alternative embodiment, library server 260 uses the targeted recipient's private player 212/226 identifier or the targeted group's private group identifier to generate scrambling map 316. Descrambling map 322 is not stored with the file as it is already known by the recipient player or group. This method targets content to a single player 212/226 or group and achieves the identical result of preventing unauthorized playback of content.

In another alternative embodiment, library server 260 does not scramble the digital information content or uses a known key to scramble the digital information content. In this embodiment, descrambling map 322 is unnecessary and is not stored with the file. Either the public or private player 212/226 identifier can be stored in the header for targeting identification purposes. Upon receipt of data from library server 260, the player 212/226 checks if its player 212/226 identifier or group identifier is included in the header. This method assumes unmodified mobile playback devices 212 and achieves the identical result of preventing unauthorized playback of content.

In another alternative embodiment, the player IDs for the targeted mobile playback devices 212 are sent to the library server 260 by the client computer system 214 when the user registers with the library server 260 to obtain the user's client ID. In this alternative embodiment, these player IDs are stored on the library server 260 in a user profile. In this embodiment, the library server 260 manages the player IDs for the targeted mobile playback devices 212.

Digital Signature Protocol

The third authentication protocol used in the present invention is the digital signature protocol. For selected data blocks generated by library server 260 and downloaded to a client computer system 214, library server 260 uses its private library key 263 to apply a digital signature to the data block. The digital signature comprises a known bit string or data pattern which is combined with the data in data blocks that are downloaded from library server 260 to client computer system 214. The library server 260 may perform this operation on all the data blocks or a selected subset of the data blocks. After a data block is downloaded to a player 212/226 through a client computer system 214, the player 212/226 can retrieve the digital signature applied by the library server 260 using a public server key known to the player 212/226. The player 212/226 can thereby verify that the data block originated with an authorized library server 260. The public server key is also known to client computer system 214, which can perform the identical operation to verify that the data block originated with an authorized library server 260. In this embodiment, library server 260 performs signatures on the content. A person of ordinary skill in the art would realize that the signatures may also be performed on the digital information by authoring system 280. The signatures may also be performed in a multiple step process shared by authoring system 280 and library server 260.

In an alternate embodiment, digital signatures are applied to downloaded material by a trusted client computer system 214. In another alternate embodiment, digital signatures are not applied to downloaded material and system security rests on the use of targeting and/or point-to-point authentication.

Downloading Digital Information Content, Software Updates, or Configuration Information from the Client Computer System to the Mobile Playback Device In a first step, the client computer system 214 and the mobile device use the point-to-point authentication protocol described above to verify that an authorized mobile playback device 212 is communicating with an authorized client computer system 214. If this is the case, the mobile playback device 212 transmits its memory map to the client computer system 214 via the mobile device interface 221. A table of contents defining the available digital information files 220 and player configuration profiles resident in client computer system 214 is displayed along with the mobile playback device 212 memory map for a user of client computer system 214. The user selects which files 220 of client computer system 214 should replace portions or segments of specified mobile playback device 212 memory as defined by the mobile playback device 212 memory map. Alternately, client browser 219 can be configured to automatically perform this selection process. In either case, the user is prevented from selecting digital information content larger than the available memory of playback device 212. In addition, control software and/or configuration data for playback device 212 may be automatically updated by client computer 214. The specified digital information files 220, associated headers, operating code, or configuration data are thereafter downloaded into mobile playback device 212 memory. The mobile playback device 212 uses checksums to verify the integrity of the download. The mobile playback device 212 uses the server public key 215, the header, and the digital signature to authenticate the download as described above. The header descrambling map is used by targeted mobile playback devices 212 to unscramble the downloaded data. In other embodiments, mobile playback device 212 may unscramble the downloaded data and/or decompress the downloaded data before authenticating the signature. Each segment of the digital information content may be independently authenticated and validated using any of the techniques described above. Digital information prompts on the mobile playback device 212 guide the user to the desired portion of the downloaded digital information content as specified by the table of contents residing in the header of the downloaded data. The user may preview selected portions of the digital information content by selecting a preview option. The preview option plays a predetermined portion of a selected digital information program. Upon selection of a particular digital information program, the selected digital information program is played for the user after the mobile playback device 212 converts the digital information content into sound or displayable imagery which is played through an audio output means or displayed on a display device.

The software player 226 of client computer system 214 may also receive digital information content in approximately the same form as the digital information content downloaded to the mobile playback device 212; however, the digital information content for the software player 226 does not need to be downloaded to the software player 226. The software player 226 has direct access to the digital information content; because, it shares memory and/or disk storage space with the client computer system 214. Therefore, there are no downloading or memory map concerns. In the same manner as the mobile playback device 212, the software player 226 performs digital signature verification, verification of checksums, and receiving targeted information. In an alternative embodiment, software player 226 may use a communication protocol similar to that of mobile playback device 212 when receiving digital information content, configuration information, and dynamically downloaded software.

Figure 4:
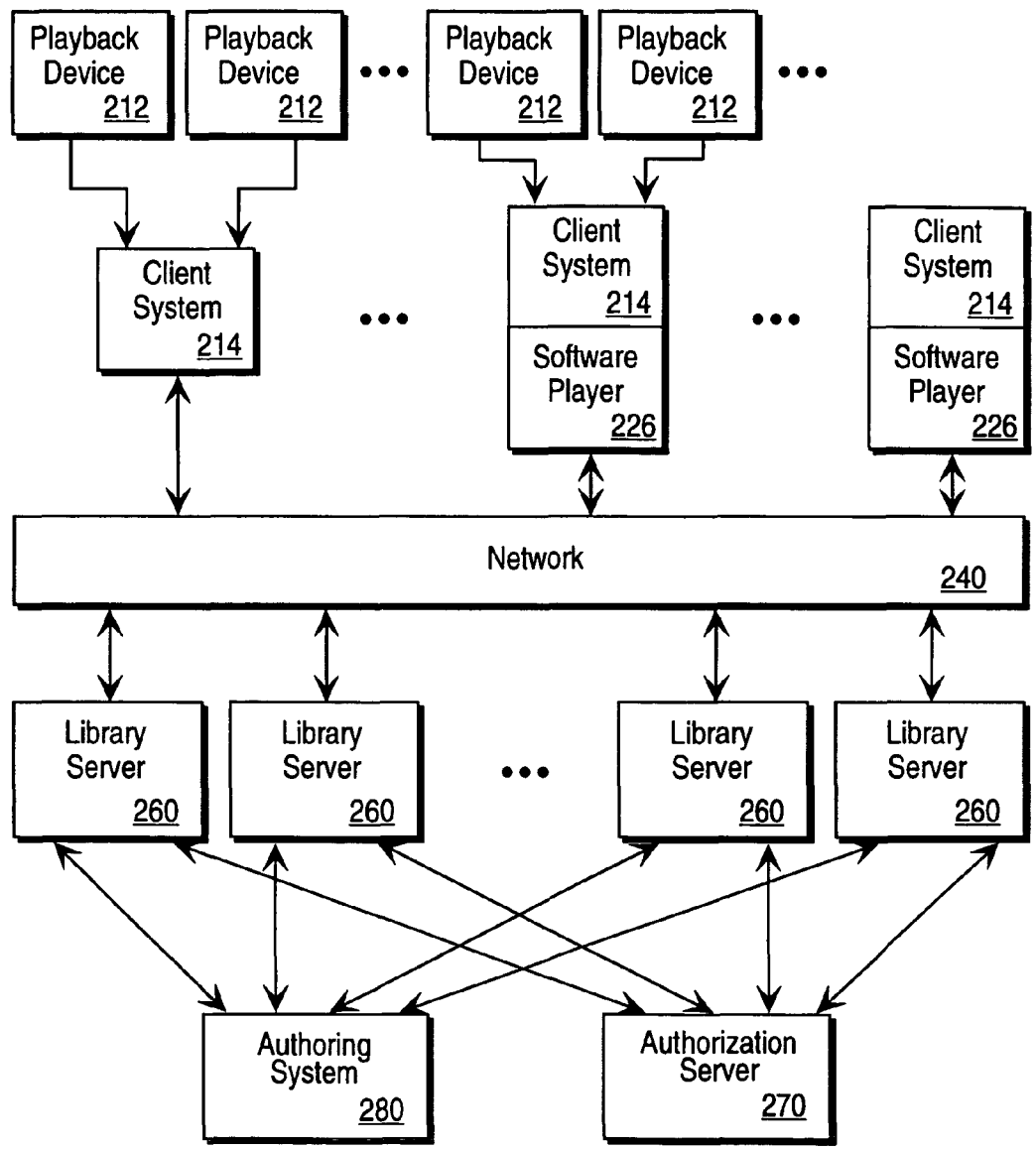
FIG. 4 illustrates an alternative embodiment having a plurality of library servers.

FIG. 4 illustrates an alternative embodiment of the present invention. As shown in FIG. 4, authoring system 280 can support a plurality of library servers 260. Each library server can be configured to support a specific type of digital information content. In the same manner described above, the client computer systems 214 access network 240 and obtain digital information content from any of the library servers 260 after performing the authentication process described above. Authorization server 270 is provided for this purpose. The configuration illustrated in FIG. 4 provides a more distributed architecture thereby dispersing the load across several server platforms. A site with many client computer systems 214 may have its own library server 260 to reduce demand on network 240. This architecture scales well as the number of client computer systems 214 grows and the content provided by the library server 260 grows.

Figure 5:
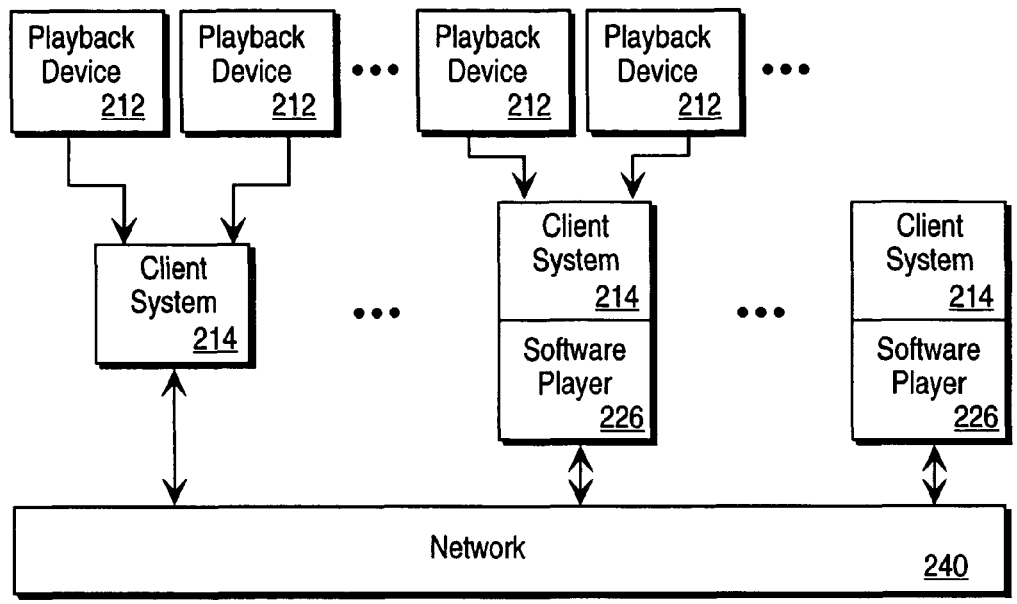
FIG. 5 illustrates an alternative embodiment having a plurality of library server processes.
Figure 5:
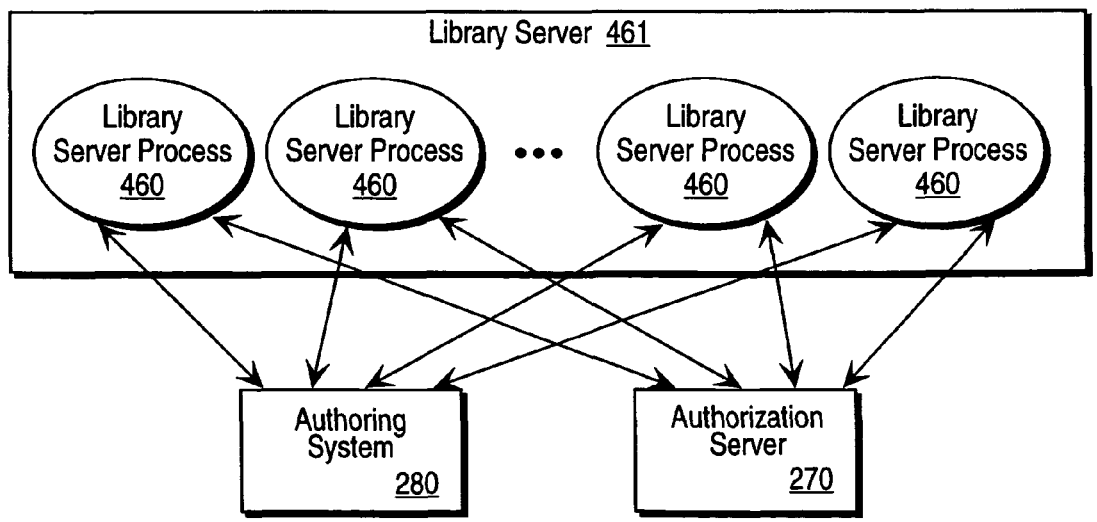

FIG. 5 illustrates another embodiment of the present invention except the library server 461 has been implemented as a plurality of separate processes or tasks 460 running concurrently on a single library server platform 461. Each library server process 460 services requests for access to its corresponding portion of the digital information content. This content is created using authoring system 280 in the manner described above. The authorization server 270 is used to validate the links between the client computer systems 214 and the library server processes 460. The configuration illustrated in FIG. 5 is advantageous in that the convenience of a single server is maintained while the scalability of multiple libraries is also supported.

Figure 6:
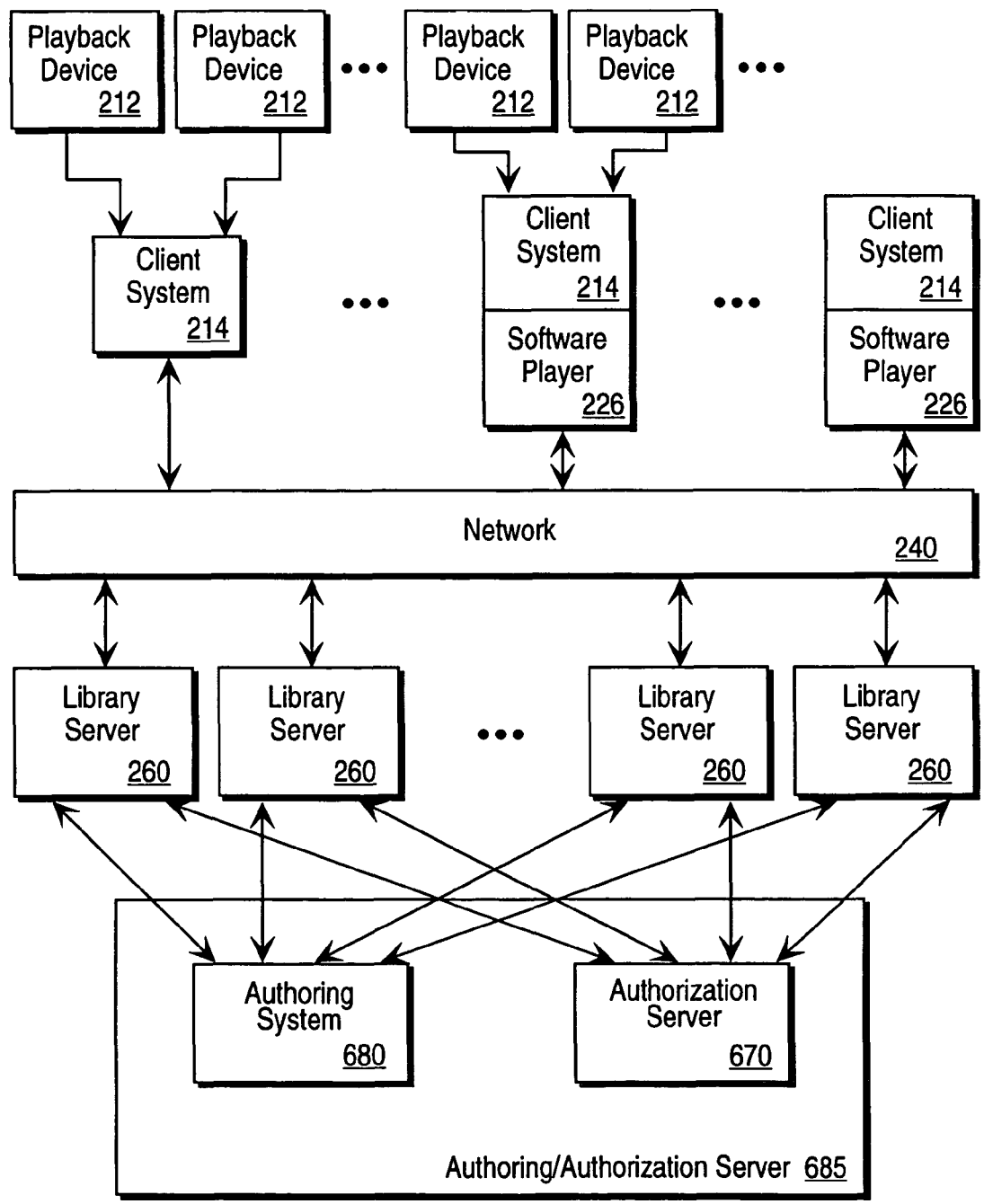
FIG. 6 illustrates an alternative embodiment having a single authoring/authorization server.

This concept can also be used for the authoring and authorization servers 280 and 270, respectively. As shown in FIG. 6, the authoring system 280 and the authorization server 270 is implemented on a single platform 685 as authoring process 680 and authorization process 670. These processes perform the same functions as described above, except the implementation provides the convenience of a single server and the scalability of multiple processes for the authoring and authorization tasks.

Figure 7:
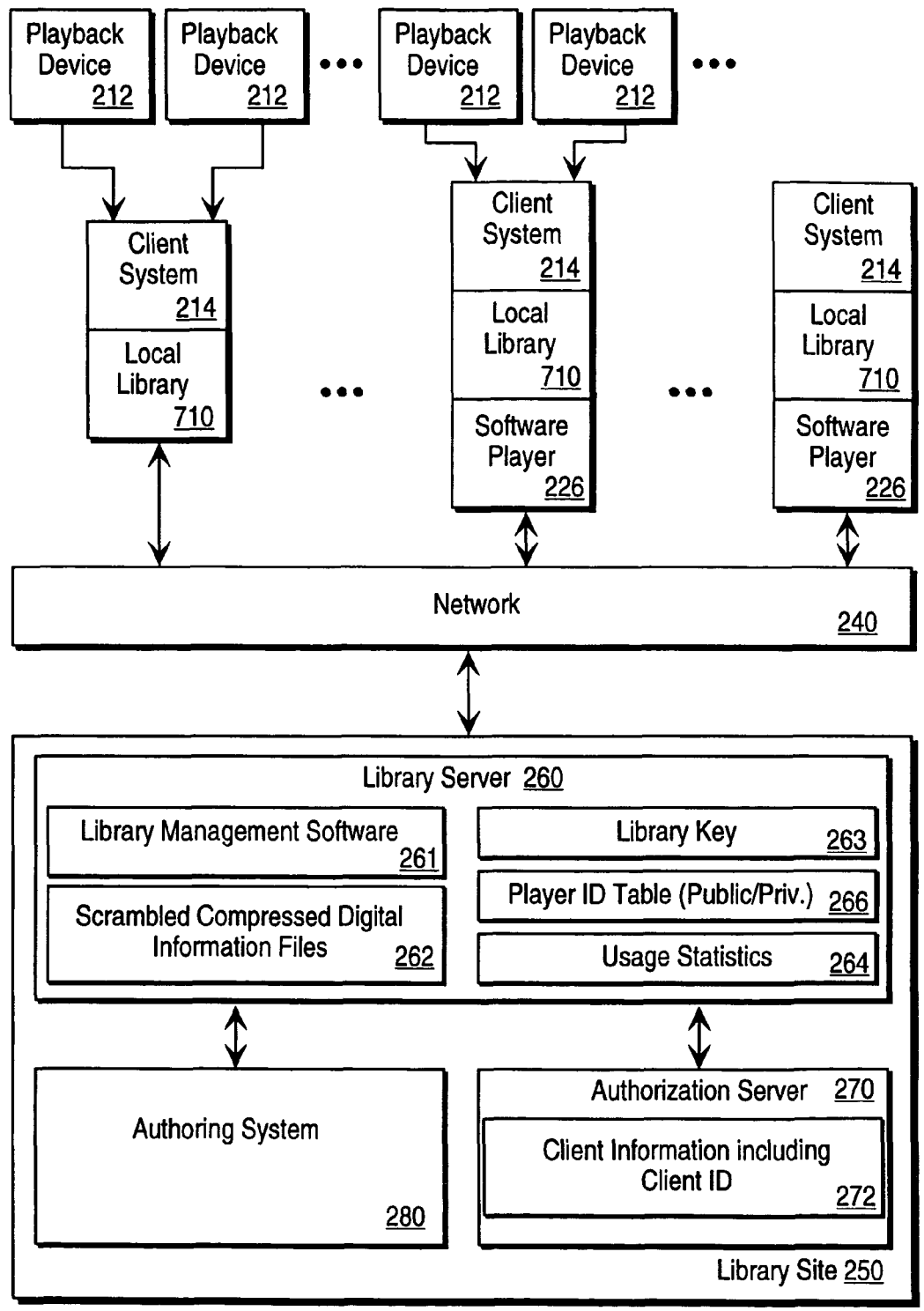
FIG. 7 illustrates an alternative embodiment wherein client computer systems have a local library.

FIG. 7 illustrates yet another alternative embodiment wherein the client computer systems 214 include a local library 710. The local library 710 provides a local storage area and library access control functionality which provides access to a subset of the archived digital information from library server 260. In the manner described above, the user of a client computer system 214 identifies the titles or items of digital information in library server 260 that the user wishes to access. In the preferred embodiment, these content selections are transferred to a client storage area 220 (as shown in FIG. 2) for subsequent downloading to mobile playback device 212. The embodiment shown in FIG. 7 expands upon the client storage area 220 and creates a local library 710. The local library 710 is used for storage of selected content; but also for searching, sorting, categorizing, and abstracting the locally stored content. The local library 710 allows a client computer system 214 to maintain a small subset of the full library which may be used to create custom collections of content in a variety of user selected configurations. Client systems 214 may be permitted to access the contents of local libraries 710 on other client systems 214. In a related alternate embodiment, library server processes 460 may also reside on selected client systems 214. This embodiment allows client systems 214 to browse and purchase content that is scrambled, targeted, and delivered from library server process 460 executing on a locally positioned client system 214. By maintaining the library locally, a portion of the network access and transfer overhead is eliminated.

Figure 8:
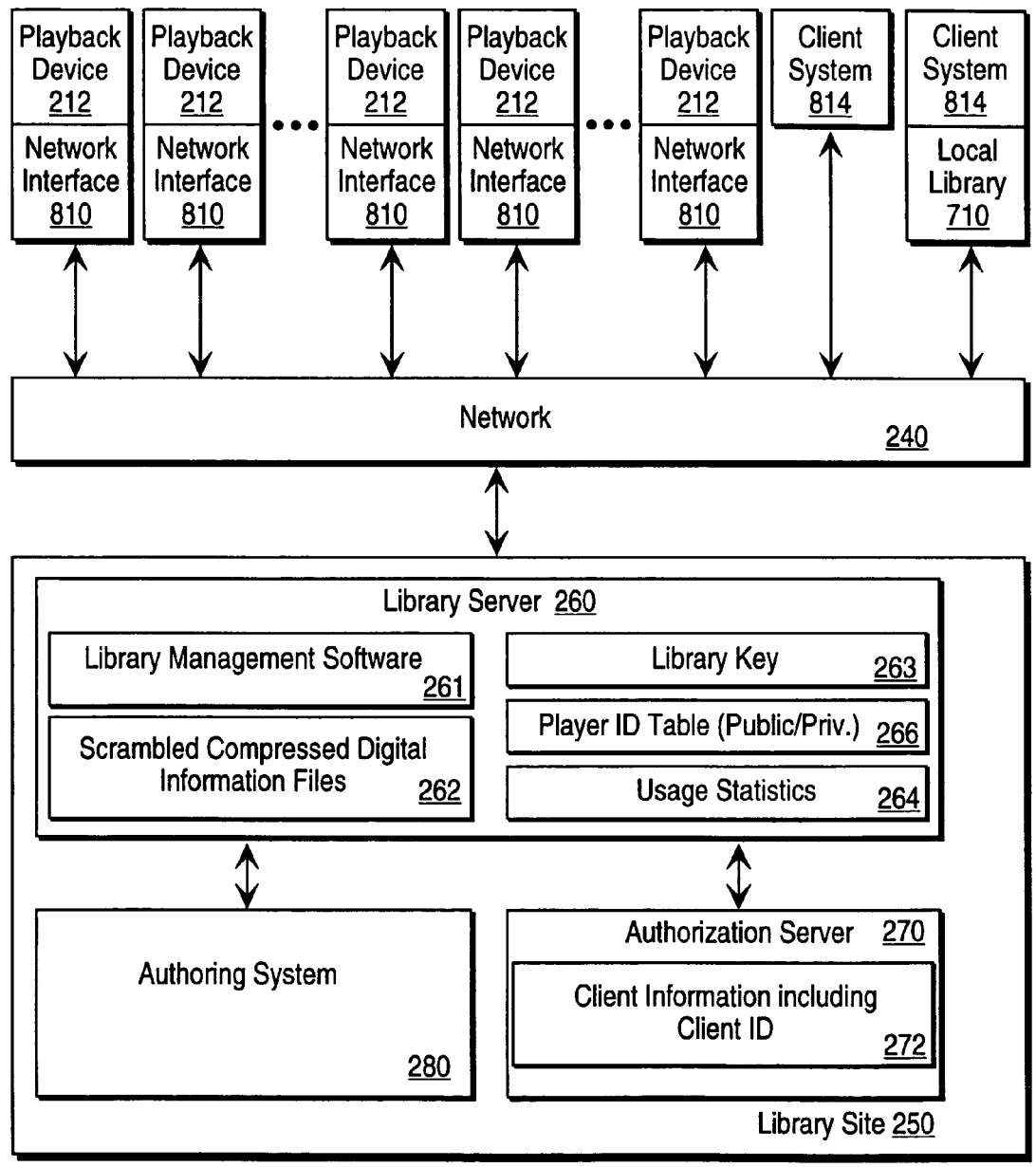
FIG. 8 illustrates an alternative embodiment wherein mobile playback devices have a direct network interface in lieu of a client computer system.

FIG. 8 illustrates another alternative embodiment of the present invention wherein the client computer system 214 is eliminated and the mobile playback device 212 is connected directly to the network 240 through network interface 810. In the preferred embodiment, the mobile playback device 212 is a minimal capability device primarily dedicated to playing audio files or displaying visual images or text on a display device. The mobile playback device 212 is minimally configured to retain its light-weight, low cost, and readily mobile features. The preferred embodiment does not therefore include the use of a portable personal computer or laptop computer; because, such devices typically do not meet the light-weight and low cost constraints of the preferred mobile playback device 212. However, the minimal mobile playback device 212 may be augmented to add network interface 810 which comprises a conventional hardware connector, hardware buffers and controllers, and firmware support for a particular conventional network protocol. For example, the mobile playback device 212 may be augmented with an integrated modem that includes a telephone jack with which the playback device may be connected to a telephone network. It will be apparent to those of ordinary skill in the art that network interface 810 may be implemented in a low cost and light-weight device such as mobile playback device 212. Because the client system browser 219 would not be available in the alternative embodiment shown in FIG. 8, a simplified user interface may be provided in firmware or other non-volatile memory of mobile playback device 212 with which the user may select items of digital information for download and playback from library server 260. As described above, the authentication process to validate the link between the mobile playback device 212 and the library server 260 must also be performed prior to user access to the library server 260 content. Alternatively, a client system 814 coupled to network 240 may be provided to support client browser 219 and thereby enable selection of items of digital information for download and playback from library server 260 directly to any of the mobile playback devices 212. Client systems 814 may support local storage of digital information, software, and configuration data in a form similar to storage space 220 or local library 710. In addition, a more simplified implementation of network interface 810 may be designed to communicate via network 240 to client system 814 instead of library server 260.

Figure 9:
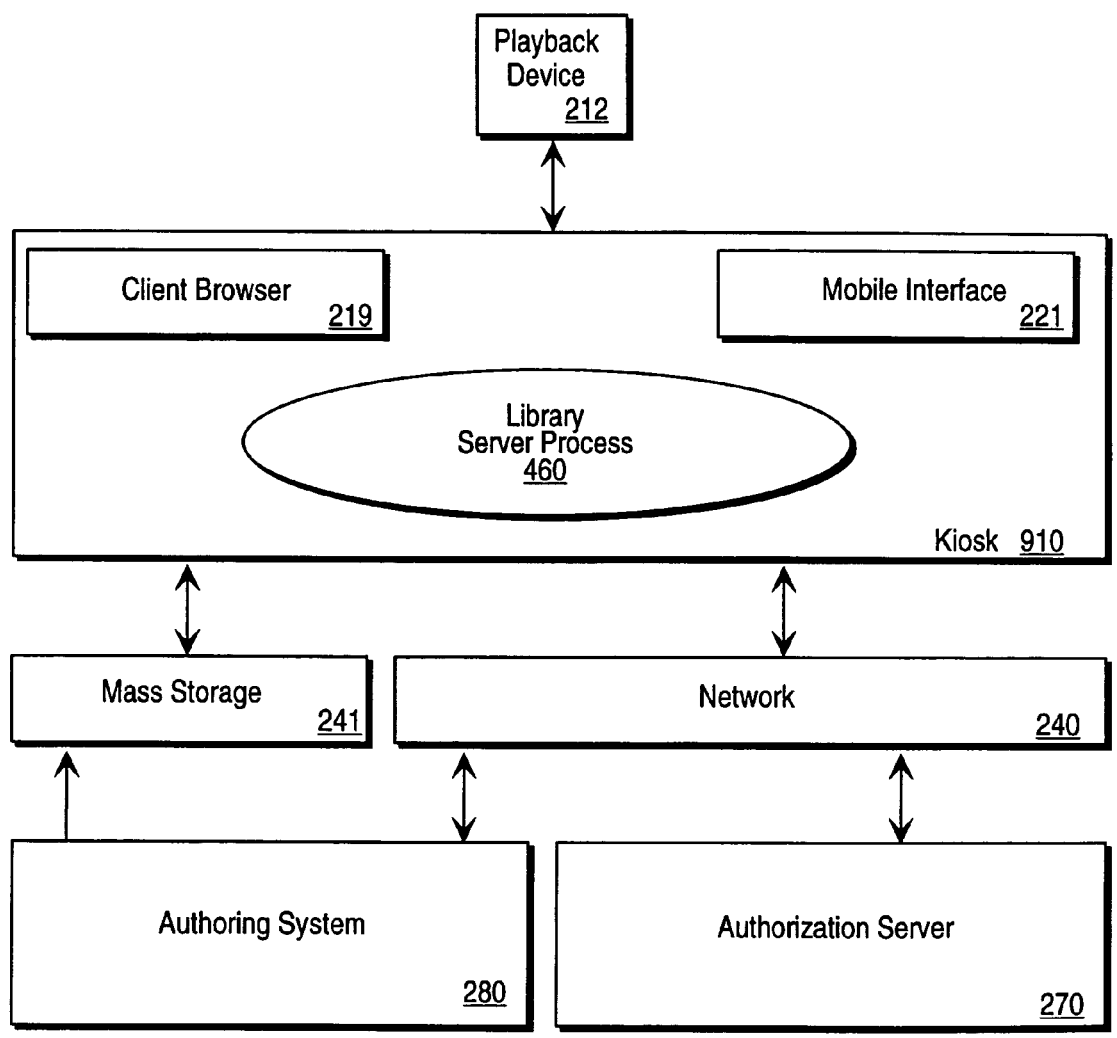
FIG. 9 illustrates an alternative embodiment wherein a kiosk is used to retain and distribute selected programming.

In another alternative embodiment of the present invention, digital information programming selections are made using the client computer system 214 and library server 260 as described above; however, the selections are delivered on mass storage medium 241. Mass storage medium 241 represents any of a variety of conventional mass storage technologies including CD-ROM, PCMCIA cards, DVDs, floppy disks, removable hard drives, digital magnetic tape, optical cards, flash memory or other optical, magnetic, electronic, or semiconductor memory devices. Upon selection by a user of a client computer system 214, selected programming is targeted and scrambled as described above and transferred to a selected mass storage medium 241 and mailed, hand-delivered, or held for pickup by the user. Once the user takes physical possession of the selected mass storage media 241, the selected programming may be read from the mass storage medium 241 by the client browser 219 and thereafter transferred to the mobile playback device 212 as described above. FIG. 9 illustrates another embodiment of the system that does not include the use of client computer 214 to transfer data to mobile playback device 212. Kiosk 910 consists of a computer system such as the one described above in FIG. 1. Kiosk 910 is a publicly accessible unit that can perform browse, content purchase, and download functions in a manner equivalent to a client computer system 214. The kiosk 910 is special because it contains its own library server for fast local access and download of content. Kiosk 910 contains a mobile device interface 221, a special version of client browser 219, and local library server process 460. Kiosk library server process 460 has local storage of scrambled and compressed digital information files 262. These compressed information files 262 originate from remote authoring system 280 and may be delivered via physical transport of mass storage media 241 or via distribution network 240. A customer operates client browser 219 to browse, select, and purchase digital information files that are delivered to the customer's mobile playback device 212. Authentication, targeting, and download processes are performed within the kiosk by library server process 460 that is connected to remote authorization server 270 over network 240. In a related embodiment, FIG. 7 shows a client system 214 with local library 710 that can be converted into a kiosk with functionality similar to kiosk 910. In this system, a special version of client browser 219 provides the same user functionality as the previous kiosk embodiment.

In another alternative embodiment of the present invention, the digital information programming selections are delivered through a media reader/writer interface that couples to the client computer system 214. The media reader/writer interface is logic that controls the transfer of control information, operating code, and digital information files from the client computer system 214 to a removable media storage. The interface logic may replace or be in addition to the mobile device interface 221.

The removable media storage is storage media capable of storing digital content, such as a flash memory card, mini-disk, CD, DVD or equivalents. The amount of digital content transferred to the removable media storage depends on storage space available in the removable media storage. The removable media storage is removably connected to a media reader/writer device, which may couple to the client computer system 214 in a wired fashion and may even be incorporated into the computer system 214. For instance, the media reader/writer device may be a USB Reader/Writer that connects to a USB port in the client computer system 214. Alternatively, the connection between the media reader/writer device and computer system 214 may be wireless. For instance, the connection between the media reader/writer device and computer system 214 may be an IR connection, a LAN connection, a wireless connection via a public network, a wireless connection via a telephone network, and so on.

The digital information programming selections on the removable media storage are rendered to the user by the mobile playback device 212. The mobile playback device connects to the removable media storage to read the digital information files. For example, a flash memory card storing digital audio content can be inserted into the mobile playback device 212. Digital content stored on the removable media storage can be rendered directly from the removable media storage or copied from the removable media storage and stored in fixed storage in the mobile playback device 212 for later rendering.

In one embodiment, as discussed previously, in order to limit the playback of digital information content, the content is targeted with a targeted header. The targeted header contains information indicative of a player ID, such as player ID 223 or player group ID 225, corresponding to a particular mobile playback device 212. Accordingly, the mobile device 212 renders the programming selections only if it corresponds to the targeted header.

Figure 10:
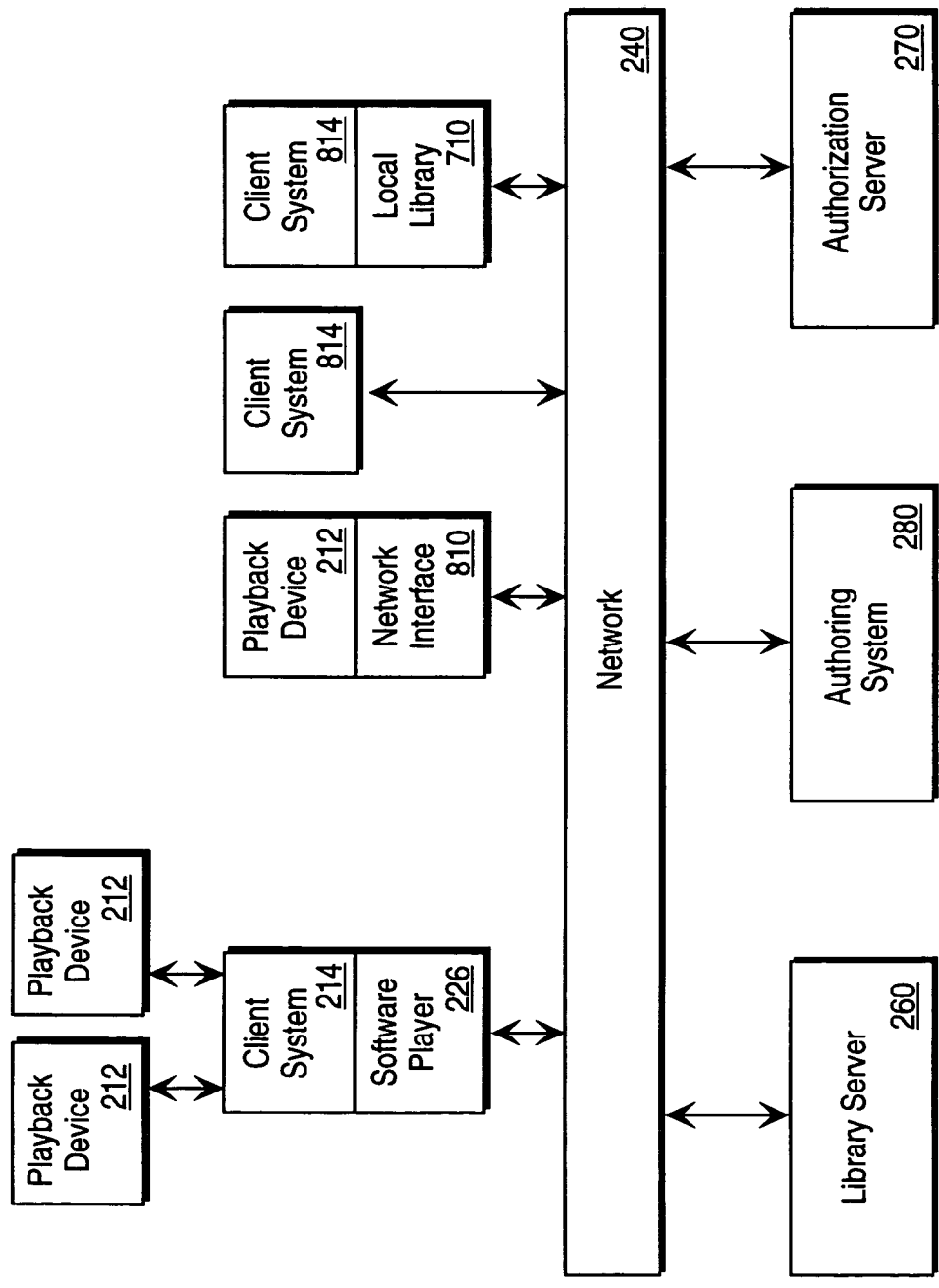
FIG. 10 illustrates an alternative embodiment wherein all system components are connected through a common network.

An alternate embodiment of the system uses a common communication network to connect all system components. In FIG. 10, network 240 is directly coupled to client system 214 and 814, network interface(s) 810, library server(s) 260, authorization server 270, and authoring system(s) 280. One of ordinary skill in the art will realize that network 240 can also be segmented into a number of independent networks or communication links without changing the functionality of the system.

Thus, a method and apparatus for implementing a computer network based digital information library system employing authentication and encryption protocols for the secure transfer of digital information library programs, software, and configuration data to a client computer system and a mobile digital information playback device removably connectable to the client computer system is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A computer-implemented method comprising:
under the control of one or more computing devices,
transferring at least one targeted digital information file to a removable media storage through a media reader/writer interface, wherein the at least one targeted digital information file includes a targeted header, wherein the targeted header includes a descrambling map that is encrypted using information indicative of a player identifier, and wherein the at least one targeted digital information file on the removable media storage is rendered by a mobile device having the player identifier, only if the information indicative of the identifier used to encrypt the descrambling map of the targeted header corresponds to the player identifier of the mobile device so as to allow the mobile device to descramble the at least one targeted digital information file using the descrambling map.

2. The computer-implemented method in claim 1, wherein the mobile device comprises a playback device, and wherein the information indicative of the player identifier used to encrypt the descrambling map of the targeted header corresponds to a player group identifier.

3. The computer-implemented method of claim 1, wherein the at least one digital information file is transferred to fixed storage on the mobile device prior to rendering.

4. The computer-implemented method of claim 1, wherein a portion of a plurality of digital information files is transferred to the removable media storage depending on storage space available in the removable media storage.

5. A non-transitory computer-readable storage medium having executable instructions to cause a processor to perform a method, the method comprising: transferring at least one targeted digital information file to a removable media storage through a media reader/writer interface, wherein at least one targeted digital information file includes a targeted header, wherein the targeted header includes information identifying a mobile playback device combined with encryption information, and wherein the at least one targeted digital information file on the removable media storage is rendered by the mobile playback device, only if the information identifying the mobile playback device in the targeted header of the at least one digital information file corresponds to at least one of the identifiers of the mobile playback device so as to allow the mobile playback device to decrypt the at least one targeted digital information file, and wherein the one or more identifiers comprise an identifier that identifies a group of two or more mobile playback devices.

6. The non-transitory computer-readable storage medium of claim 5, wherein the one or more identifiers comprise a player identifier.

7. The non-transitory computer-readable storage medium of claim 5, wherein the at least one digital information file is transferred to fixed storage on the mobile playback device prior to rendering.

8. The non-transitory computer-readable storage medium of claim 5, wherein a portion of a plurality of digital information files is transferred to the removable media storage depending on storage space available in the removable media storage.

9. A computer system comprising: a processor coupled to a memory through a bus; and a process executed from the memory by the processor to cause the processor to transfer at least one targeted digital information file to a removable media storage through a media reader/writer interface, wherein at least one targeted digital information file includes targeting information, wherein the targeting information includes information identifying a mobile playback device combined with a descrambling map, and wherein the at least one targeted digital information file on the removable media storage is rendered by the mobile playback device, only if the information identifying the mobile playback device included in the targeting information corresponds to at least one of the identifiers of the mobile playback device so as to allow the mobile playback device to descramble the at least one targeted digital information file using the descrambling map, and wherein the one or more identifiers comprise an identifier that identifies a group of two or more mobile playback devices.

10. The system of claim 9, wherein the one or more identifiers comprise a player identifier.

11. The system of claim 9, wherein the at least one digital information file is transferred to fixed storage on the mobile playback device prior to rendering.

12. The system of claim 9, wherein a portion of a plurality of digital information files is transferred to the removable media storage depending on storage space available in the removable media storage.

13. An apparatus comprising: means for receiving a targeted digital information file; and means for transferring the targeted digital information file to a removable media storage through a media reader/writer interface, wherein the targeted digital information file includes a targeted header within the file, wherein the targeted header includes combined encryption and device identification information, and wherein the targeted digital information file on the removable media storage is rendered by a mobile device having one or more identifiers, only if the device identification information included in the targeted header of the targeted digital information file corresponds to at least one of the identifiers of the mobile device so as to allow the mobile device to decrypt the targeted digital information file, and wherein the one or more identifiers comprise an identifier that identifies a group of two or more mobile devices.

14. The apparatus of claim 13, further comprising means for targeting the digital information file using a player identifier.

15. The apparatus of claim 13, further comprising means for targeting the digital information file using a player group identifier.

16. The apparatus of claim 13, further comprising means for transferring the digital information file to fixed storage on the mobile device prior to rendering.

17. A computer based library and information delivery system comprising:
a computer system connectable to a public network, the computer system including logic for transferring targeted digital programming content to a removable media storage through a media reader/writer interface, wherein the targeted digital program content includes a targeted header within the content, wherein the targeted header includes combined encryption and device identification information; and
at least one mobile device having one or more identifiers; wherein the one or more identifiers comprise an identifier that identifies a group of two or more mobile devices, and wherein the at least one mobile device includes:
logic for reading the targeted digital programming content from the removable media storage; and
logic for rendering the targeted digital programming content to a user only if the device identification information of the targeted header in the digital programming content corresponds to at least one of the identifiers of the at least one mobile device, so as to allow the at least one mobile device to decrypt the targeted digital program content.

18. A computer based library and information delivery system comprising:
a computer system connectable to a public network, the computer system including logic for transferring targeted digital programming content to a removable media storage through a media reader/writer interface, wherein the targeted digital programming content includes targeting information including information identifying a mobile device combined with a descrambling map, and the computer system further including logic for rendering the targeted digital programming content by the mobile device only if at least one identifier of the mobile device corresponds to the information identifying the mobile device included in the targeting information of the digital programming content, and wherein the digital programming content is targeted to the mobile device using the information identifying the mobile device included in the targeting information, said comprising an identifier that identifies a group of two or more mobile devices.

19. The computer based library and information delivery system of claim 17, wherein the digital programming content is transferred to fixed storage on the mobile device prior to rendering.

20. The computer based library and information delivery system of claim 17, wherein a portion of the digital programming content is transferred to the removable media storage depending on storage space available in the removable media storage.

* * * * *